(12) United States Patent
Jeong et al.

(10) Patent No.: US 11,851,540 B2
(45) Date of Patent: Dec. 26, 2023

(54) LAMINATED FILM, AND COMPOSITION FOR PREPARING SAME

(71) Applicants: SAMSUNG ELECTRONICS CO., LTD., Suwon-si (KR); SAMSUNG SDI CO., LTD., Yongin-si (KR)

(72) Inventors: Boreum Jeong, Sejong-si (KR); Chanjae Ahn, Suwon-si (KR); Hye Young Kong, Uijeongbu-si (KR); Sun Jin Song, Seoul (KR); A Ra Jo, Suwon-si (KR); Kyeong-sik Ju, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 535 days.

(21) Appl. No.: 16/943,166

(22) Filed: Jul. 30, 2020

(65) Prior Publication Data

US 2021/0032420 A1 Feb. 4, 2021

(30) Foreign Application Priority Data

Jul. 30, 2019 (KR) .................. 10-2019-0092733

(51) Int. Cl.
| | | |
|---|---|---|
| *B32B 27/08* | (2006.01) | |
| *B32B 27/34* | (2006.01) | |
| *B32B 27/28* | (2006.01) | |
| *B32B 7/023* | (2019.01) | |
| *C08J 5/18* | (2006.01) | |

(52) U.S. Cl.
CPC .............. *C08J 5/18* (2013.01); *B32B 7/023* (2019.01); *B32B 27/08* (2013.01); *B32B 27/281* (2013.01); *B32B 27/34* (2013.01); *B32B 2250/02* (2013.01); *B32B 2250/24* (2013.01);
(Continued)

(58) Field of Classification Search
CPC .............. B32B 7/00–7/14; B32B 27/00–27/42
See application file for complete search history.

(56) References Cited

U.S. PATENT DOCUMENTS

| | | |
|---|---|---|
| 9,951,250 B2 | 4/2018 | Cho et al. |
| 2005/0208383 A1 | 9/2005 | Totsuka et al. |

(Continued)

FOREIGN PATENT DOCUMENTS

| | | |
|---|---|---|
| JP | 2007253384 A | 10/2007 |
| JP | 2014028326 A | 2/2014 |

(Continued)

*Primary Examiner* — Prashant J Khatri
(74) *Attorney, Agent, or Firm* — CANTOR COLBURN LLP

(57) ABSTRACT

A laminated film which includes a first layer including a poly(amide-imide) copolymer, and a second layer laminated on at least one surface of the first layer. The second layer includes a poly(amide-imide) copolymer, polyimide, or a combination thereof, which has an amide content of less than or equal to about 30 mol %. The poly(amide-imide) copolymer included in the first layer has a weight average molecular weight of about 30,000 grams/mole to about 200,000 grams/mole, and the polyimide, the poly(amide-imide) copolymer, or the combination thereof, of the second layer has a weight average molecular weight of about 10,000 grams/mole to about 50,000 grams/mole, and the composition for preparing the laminated film.

20 Claims, 3 Drawing Sheets

(52) U.S. Cl.
CPC ....... *B32B 2255/10* (2013.01); *B32B 2270/00* (2013.01); *B32B 2307/418* (2013.01); *C08J 2379/08* (2013.01)

(56) References Cited

U.S. PATENT DOCUMENTS

| | | |
|---|---|---|
| 2006/0204678 A1 | 9/2006 | Hayashi et al. |
| 2011/0311796 A1* | 12/2011 | Jung ........................ G02B 1/14 |
| | | 428/220 |
| 2017/0342224 A1 | 11/2017 | Chae et al. |
| 2018/0112049 A1* | 4/2018 | Song ....................... C08G 69/42 |
| 2018/0305498 A1* | 10/2018 | Chae ........................... C08J 5/18 |
| 2019/0009505 A1* | 1/2019 | Song ....................... B32B 15/08 |
| 2019/0077915 A1 | 3/2019 | Yun et al. |
| 2019/0263095 A1* | 8/2019 | Paek ....................... C08G 73/14 |

FOREIGN PATENT DOCUMENTS

| | | | |
|---|---|---|---|
| KR | 20060036894 A | 5/2006 | |
| KR | 20060043693 A | 5/2006 | |
| KR | 20150077177 A | 7/2015 | |
| KR | 20150094081 A | 8/2015 | |
| KR | 20170131435 A | 11/2017 | |
| KR | 20170132499 A | 12/2017 | |
| KR | 20170136285 A | 12/2017 | |
| KR | 20180044189 A | 5/2018 | |
| WO | WO-2018124466 A1 * | 7/2018 | ............. B32B 27/08 |

\* cited by examiner

LAMINATED FILM, AND COMPOSITION FOR PREPARING SAME

CROSS-REFERENCE TO RELATED APPLICATION

This application claims priority to Korean Patent Application No. 10-2019-0092733 filed in the Korean Intellectual Property Office on Jul. 30, 2019, and all the benefits accruing therefrom under 35 U.S.C. 119, the content of which in its entirety is incorporated herein by reference.

BACKGROUND

1. Field

A laminated film and a composition for preparing the laminated film are disclosed.

2. Description of the Related Art

Portable display devices such as a smart phone or a tablet PC are of significant consumer interest, and therefore, research and development activity for such devices, particularly to improve upon performance and customer preferences and interests. For example, lightweight flexible (i.e., bendable or foldable) portable display devices have been studied, developed, and are presently being commercialized.

The portable display device of a liquid crystal display or the like includes a protective window for protecting a display module such as a liquid crystal layer. Currently, most portable display devices include a window including a rigid glass substrate. However, because glass is fragile or sensitive to exterior impact, the glass protective window can easily crack or break when applied to a portable display device or the like. Also, glass being relatively inflexible is not readily applicable to a flexible display device. Accordingly, there have been attempts to substitute a protective glass window with a plastic film in a display device. However, a plastic film is needed with improvements in mechanical properties, optical properties, heat resistance, and the like in order to be applied as a protective window in a display device and simultaneously to have high appearance quality.

SUMMARY

An embodiment provides a laminated film having excellent optical properties and mechanical properties and capable of suppressing color mura occurrence to improve visibility.

Another embodiment provides a composition for preparing the laminated film.

An embodiment provides a laminated film, wherein the laminated film includes a first layer including a poly(amide-imide) copolymer, and a second layer laminated on at least one surface of the first layer. The second layer includes a poly(amide-imide) copolymer, polyimide, or a combination thereof, which has an amide content of less than or equal to about 30 mol % based on a total number of moles of structural units. The poly(amide-imide) copolymer included in the first layer has a weight average molecular weight of about 30,000 grams/mole to about 200,000 grams/mole, and the polyimide, the poly(amide-imide) copolymer, or the combination thereof, included in the second layer has a weight average molecular weight of about 10,000 grams/mole to about 50,000 grams/mole.

The second layer may have a lower refractive index than the first layer.

The poly(amide-imide) copolymer of the first layer and the poly(amide-imide) copolymer or polyimide of the second layer may each independently include an imide structural unit represented by Chemical Formula 1:

Chemical Formula 1

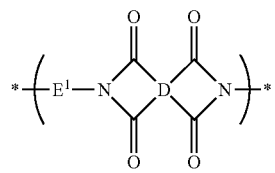

wherein, in Chemical Formula 1,
D is a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof,
the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof,
E$^1$ is a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof,
the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof, and
D of Chemical Formula 1 may be selected from the chemical formulae of Group 1:

Group 1

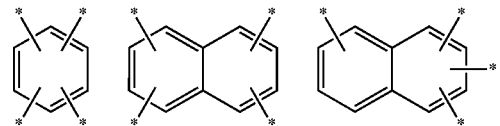

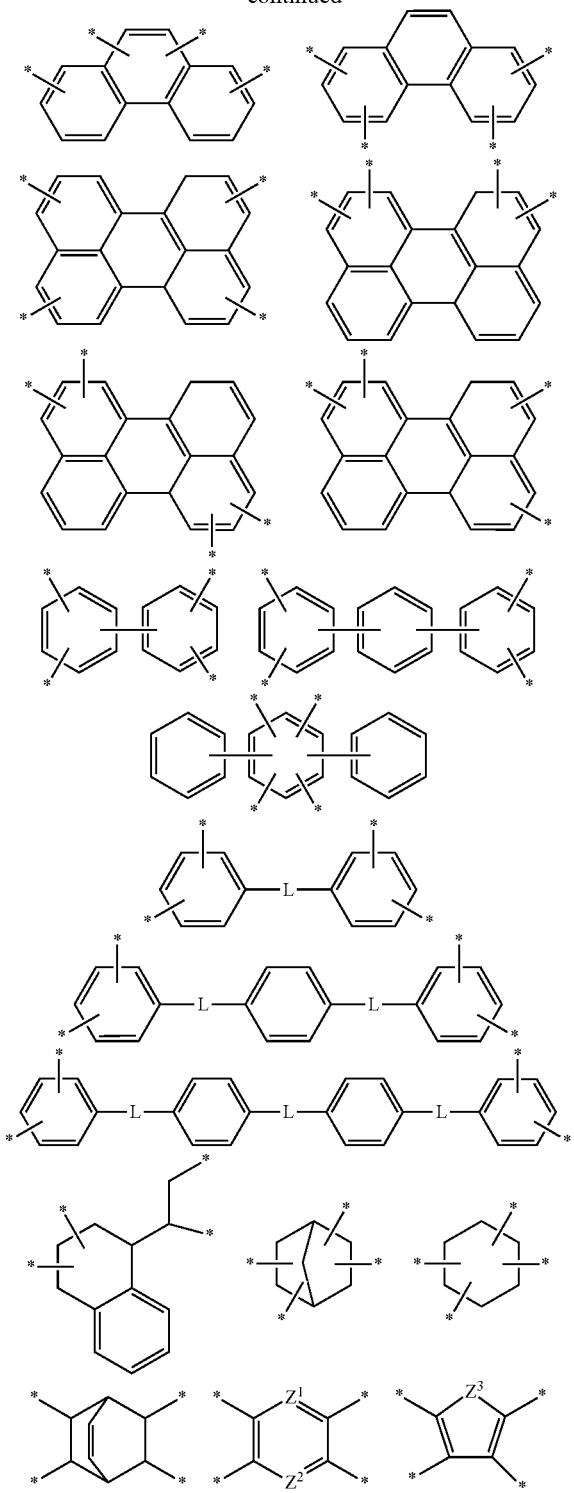

-continued wherein in the above chemical formulae,
each moiety may be substituted or unsubstituted, each L is the same or different and is each independently a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, or —C(=O)NH—,
is a linking portion with an adjacent atom,
Z$^1$ and Z$^2$ are each independently the same or different and are each independently —N= or —C(R$^{100}$)=, wherein R$^{10o}$ is hydrogen or a C1 to C5 alkyl group, provided that Z$^1$ and Z$^2$ are not simultaneously —C(R$^{100}$)=, and
Z$^3$ is —O—, —S—, or —NR$^{101}$—, wherein R$^{101}$ is hydrogen or a C1 to C5 alkyl group.
D of Chemical Formula 1 may be selected from the chemical formulae of Group 2:

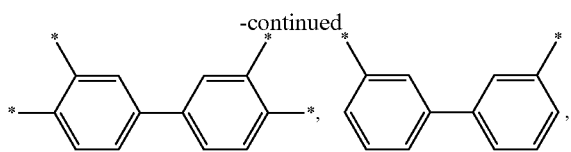
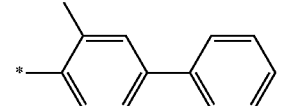
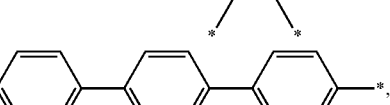
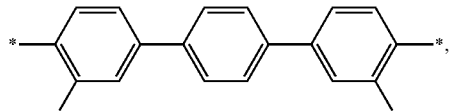
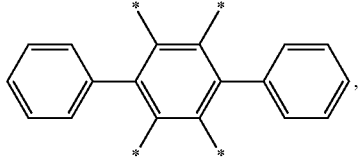
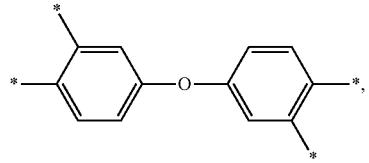
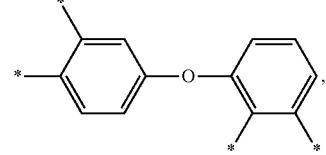
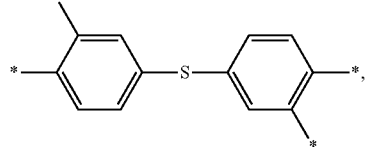
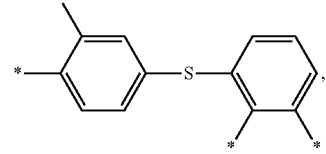
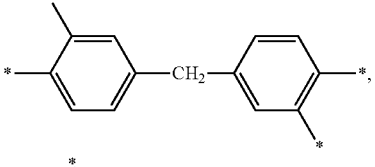
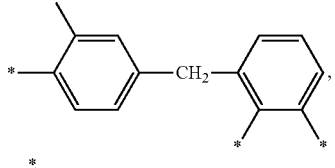
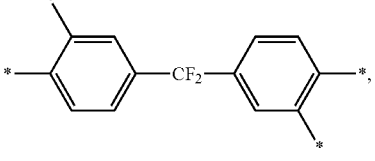
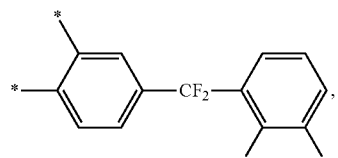
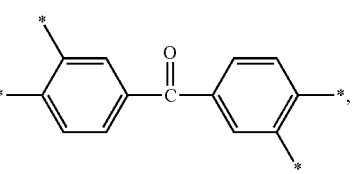
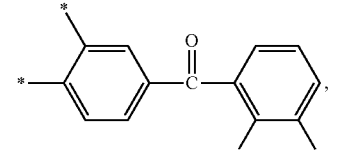
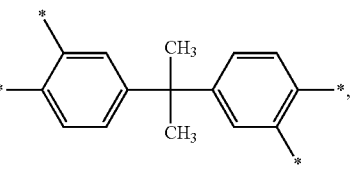
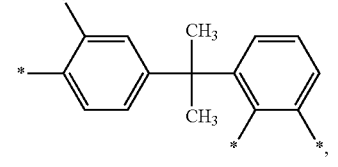
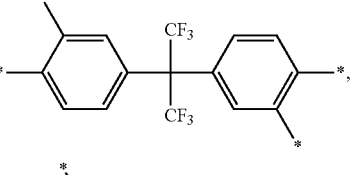
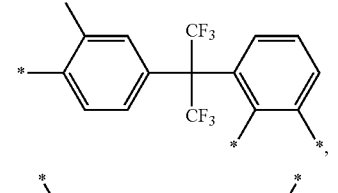
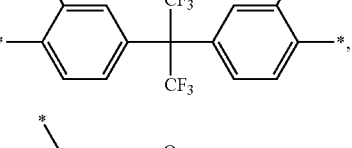
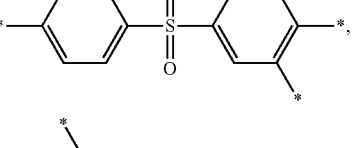
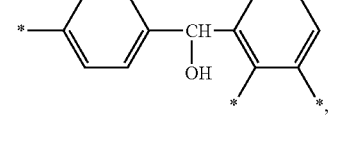

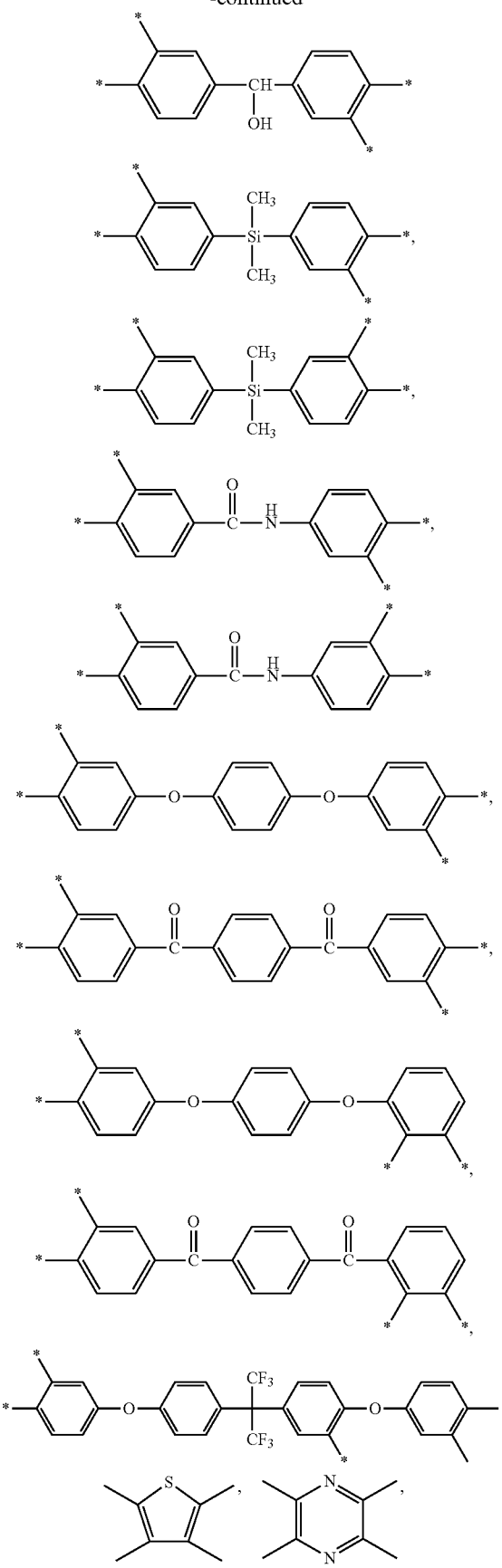

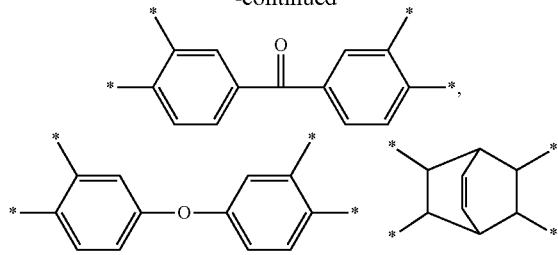

E¹ of Chemical Formula 1 may be a substituted or unsubstituted aromatic single ring, a substituted or unsubstituted C10 to C30 condensed ring in which two or more aromatic rings are fused, or at least two aromatic rings independently selected from the single ring or the condensed ring, which are linked with each other by a single bond, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof.

E¹ of Chemical Formula 1 may be a group in which two or more substituted or unsubstituted phenylene groups are linked with a single bond, —O—, —S—, —(CH$_2$)$_p$—, —(CF$_2$)$_q$— (wherein 1≤p≤10 and 1≤q≤10), or a combination thereof.

The imide structural unit represented by Chemical Formula 1 may be a group represented by Chemical Formula 1-1:

Chemical Formula 1-1

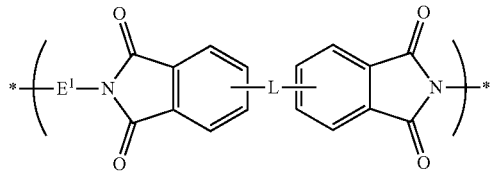

wherein, in Chemical Formula 1-1,
L is a single bond, —C(C$_n$F$_{2n+1}$)$_2$— (wherein 1≤n≤10), or a combination thereof, and
E¹ is represented by Chemical Formula 7 or Chemical Formula 8:

Chemical Formula 7

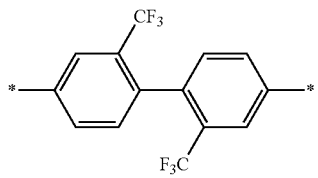

Chemical Formula 8

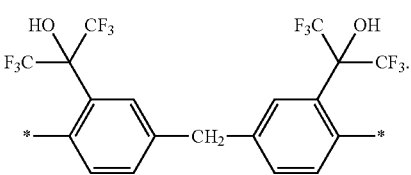

The poly(amide-imide) copolymer of the first layer and the poly(amide-imide) copolymer of the second layer may further include an amide structural unit represented by Chemical Formula 2:

Chemical Formula 2

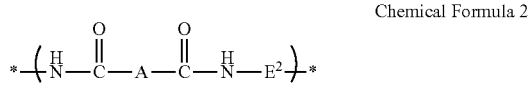

wherein, in Chemical Formula 2,

A and $E^2$ are each independently a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof.

A of Chemical Formula 2 may be selected from chemical formulae represented by Group 3:

Group 3

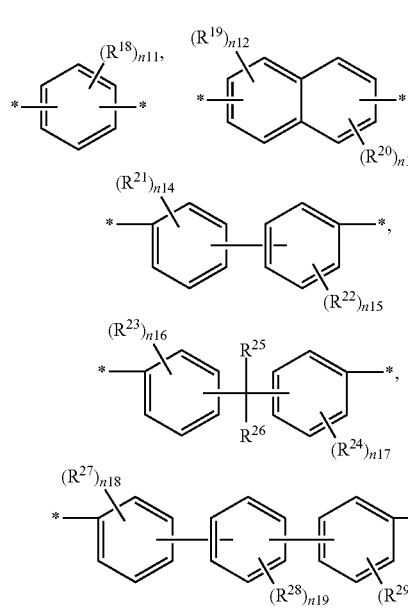

In the above chemical formulae, $R^{18}$ to $R^{29}$ are the same or different, and are each independently deuterium, a halogen, a substituted or unsubstituted C1 to C10 aliphatic organic group, or a substituted or unsubstituted C6 to C20 aromatic organic group, n11 and n14 to n20 are each independently an integer ranging from 0 to 4, and n12 and n13 are each independently an integer ranging from 0 to 3.

A of Chemical Formula 2 may be selected from the chemical formulae represented by Group 4:

Group 4

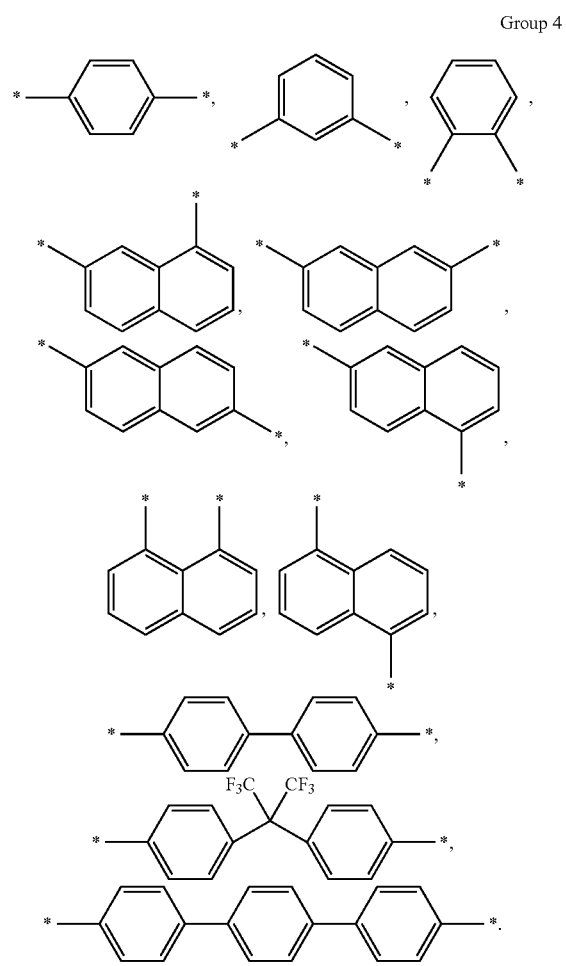

$E^2$ of Chemical Formula 2 may be a substituted or unsubstituted, aromatic single ring, a substituted or unsubstituted C10 to C30 condensed ring in which two or more aromatic rings are fused, or at least two aromatic rings independently selected from the single ring or the condensed ring, which are linked with each other by a single bond, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof.

$E^2$ may be a group in which two or more substituted or unsubstituted phenylene groups are linked with a single bond, —O—, —S—, —(CH$_2$)$_p$—, —(CF$_2$)$_q$— (wherein 1≤p≤10 and 1≤q≤10), or a combination thereof.

A of Chemical Formula 2 may be an unsubstituted phenylene group, an unsubstituted biphenylene group, or a combination thereof, and $E^2$ may be a group represented by Chemical Formula 7 or Chemical Formula 8:

Chemical Formula 7

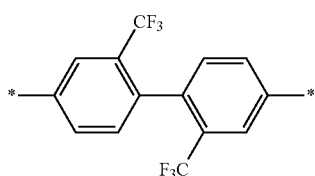

Chemical Formula 8

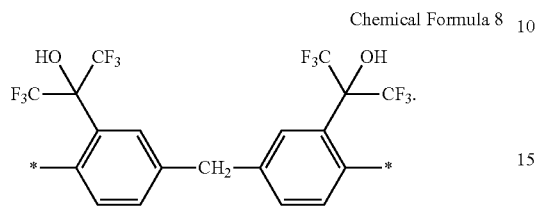

The poly(amide-imide) copolymer of the first layer may be included in an amount of about 30 mol % to about 80 mol % of the amide structural unit based on a total number of moles of structural units in the poly(amide-imide) copolymer.

The first layer may have a thickness of about 10 micrometers (μm) to about 300 μm and the second layer may have a thickness of about 0.1 μm to about 10 μm.

The laminated film may have an average transmittance of greater than or equal to 89%, 89.5%, or 90%, in a wavelength range of about 300 nanometers (nm) to about 760 nm and a yellow index YI of less than or equal to 2.5, 2.4, or 2.3.

In one embodiment, the second layer may be disposed on a surface and an opposite surface of the first layer, and may further include a hard coating layer on one of the two second layers, and may further include an adhesive layer (PSA) on the other of the two second layers.

Another embodiment provides a composition product for preparing the laminated film. The composition product includes a first composition for forming the first layer, and a separate second composition for forming the second layer, wherein the first and the second compositions form a first layer and a second layer, respectively, with the second layer laminated on at least one surface of the first layer. The first composition includes a poly(amide-imide) copolymer including an imide structural unit represented by Chemical Formula 1 and an amide structural unit represented by Chemical Formula 2 and having a weight average molecular weight of about 30,000 grams/mole to about 200,000 grams/mole, and the second composition includes polyimide including an imide structural unit represented by Chemical Formula 1, and having a weight average molecular weight of about 10,000 grams/mole to about 50,000 grams/mole, a poly(amide-imide) copolymer including an imide structural unit represented by Chemical Formula 1 and an amide structural unit represented by Chemical Formula 2, wherein a content of the amide structural unit represented by Chemical Formula 2 is less than or equal to about 30 mol % based on a total number of moles of structural units, and having a weight average molecular weight of about 10,000 grams/mole to about 50,000 grams/mole, or a combination thereof:

Chemical Formula 1

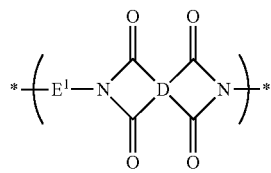

wherein, in Chemical Formula 1,

D is a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof, the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof, E$^1$ is a substituted or unsubstituted divalent aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof;

Chemical Formula 2

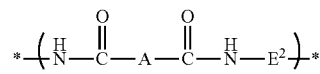

wherein, in Chemical Formula 2,

A and E$^2$ are each independently, a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof.

Another embodiment provides a laminated film prepared by coextrusion and in-line coating of the first composition and the second composition.

The laminated film according to an embodiment may have excellent optical properties and mechanical properties, and may suppress color mura occurrence to improve visibility. Accordingly, the laminated film may be applied as a window for a flexible display device and the like. In addition, as the laminated film according to an embodiment may be easily obtained by co-extruding and in-line coating, a composition product for preparing the laminated film according to an embodiment may effectively reduce the production cost or improve upon production efficiencies.

DETAILED DESCRIPTION

Figure 1:
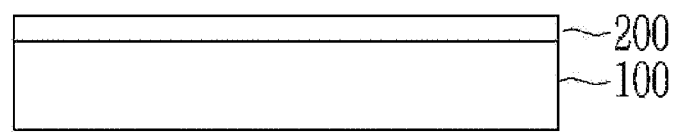
FIG. 1 is a view showing a schematic cross-section of a laminated film in which a second layer 200 is laminated on a surface of a first layer 100 according to an embodiment.

Hereinafter, embodiments of the present invention are described in detail with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer" or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore encompasses both an orientation of "lower" and "upper," depending on the particular orientation of the figure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±5% or ±2% of the stated value.

Unless otherwise defined, all terms (including technical and scientific term) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when specific definition is not otherwise provided, "substituted" refers to replacement of at least one hydrogen of a given functional group by a substituent selected from a halogen atom (F, Cl, Br, or I), a hydroxy group, a nitro group, a cyano group, an amino group —NH$_2$, —NH(R$^{100}$) or —N(R$^{101}$)(R$^{102}$), wherein R$^{100}$, R$^{101}$, and R$^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group (e.g., cycloalkyl group, etc.), a substituted or unsubstituted aryl group (e.g., benzyl group, naphthyl group, fluorenyl group, etc.), a substituted or unsubstituted alkenyl group, a substituted or unsubstituted alkynyl group, a substituted or unsubstituted heteroaryl group and a substituted or unsubstituted heterocyclic group, or the substituents may be linked with each other to form a ring.

As used herein, when specific definition is not otherwise provided, "alkyl group" refers to a C1 to C30 alkyl group, and specifically a C1 to C15 alkyl group, "cycloalkyl group" refers to a C3 to C30 cycloalkyl group, and specifically a C3 to C18 cycloalkyl group, "alkoxy group" refers to a C1 to C30 alkoxy group, and specifically a C1 to C18 alkoxy group, "ester group" refers to a C2 to C30 ester group, and specifically a C2 to C18 ester group, "ketone group" refers to a C2 to C30 ketone group, and specifically a C2 to C18 ketone group, "aryl group" refers to a C6 to C30 aryl group, and specifically a C6 to C18 aryl group, and "alkenyl group" refers to a C2 to C30 alkenyl group, and specifically a C2 to C18 alkenyl group.

As used herein, when specific definition is not otherwise provided, the term "combination" refers to mixing or copolymerization. Herein, "copolymerization" refers to a random copolymerization, a block copolymerization, or a graft copolymerization.

As used herein, the term "polyimide" refers to "polyimide," "polyamic acid" and a combination thereof as well as "polyimide" itself. The terms "polyimide" and "polyamic acid" may be used to have the same meanings.

In addition, as used herein, "*" refers to a portion of attachment to another atom or another chemical formula or adjacent structural unit of a copolymer. In the drawings, the thickness of layers, films, panels, regions, etc., are exaggerated for clarity. Like reference numerals designate like elements throughout the specification. Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that when an element such as a layer, film, region, or substrate is referred to as being "on" another element, it may be directly on the other element or intervening elements may also be present. In contrast, when an element is referred to as being "directly on" another element, there are no intervening elements present.

An embodiment provides a laminated film that may be used as a cover window to protect a display device such as a flexible display device or a foldable display device, for example, protection against damage from impacts or environmental contaminants.

A glass substrate has been conventionally used for protecting the display device, but when a device design includes flexible and foldable characteristics, it is necessary to use a plastic material having sufficient optical and mechanical properties. These properties include hardness or toughness, and strength as a window of a display device as well as light transmittance, color or the like similar to those of the glass substrate so as to function as a display device. A cover window for a display device requires high appearance quality as well as high optical characteristics, durability, and flexural properties.

Research on a use of a polyimide-based transparent film having high durability and heat resistance as a plastic material and satisfying optical characteristics is of interest and is ongoing. In particular, a laminated film including a hard coating layer positioned on a polyimide substrate to achieve a film with a hardness similar to or approaching glass is also of interest and ongoing. However, due to the lamination of the two layers having different refractive indexes, an interference phenomenon may occur, and a difference in thickness and refractive index of each layer may heighten the interference phenomenon resulting in a strong rainbow effect on the film surface. Even though the inherent characteristics of the layer film materials, e.g., refractive index, are very similar or the same, a thickness deviation may occur in a layer material as a result of a film forming process, a coating process, etc., which may heighten the rainbow effect. The rainbow effect of an optical film is a phenomenon in which a reflectance varies, or the viewing angle changes depending on a position of the wide region of the film, as observed with the naked eye.

In one embodiment, as a way to suppress the rainbow effect and the like caused by a film-formation process, a coating process is described that includes providing an inter-mixing zone where the respective layer materials for forming each layer are present and are mixed with each other proximate to an interface between the two layers of a laminated film. Accordingly, the materials for forming each layer may be somewhat uniformly mixed in the inter-mixing zone, thereby the interference effect caused by optical or dimensional differences in the two layer materials may be minimized or reduced at the interface of the two different layers, and the method may suppress the rainbow effect over much of the surface of the laminated optical film. As in above, the method of forming the inter-mixing zone where the material for forming each layer are present and mix with each other proximate to the interface of the two layers may include a method of simultaneously coating materials for forming two layers, which we refer to as "in-line coating." In order to apply the in-line coating, coating solutions of materials for forming each respective layer may have an appropriate viscosity and also have a high glass transition temperature.

The present Inventors find that an acceptable laminated film may be obtained by in-line coating two layers each of which includes a poly(amide-imide) copolymer and/or polyimide as the material having a high glass transition temperature, wherein the polyimide and/or poly(amide-imide) copolymer for each respective layer satisfies a set range of weight average molecular weight. The resulting laminated film may have equivalent, or near-equivalent, optical properties in comparison to the two layers each present as a single layer film. Moreover, the resulting laminated film may possess improved mechanical properties such as elastic modulus, and may reduce or minimize mura occurrence such as interference mura or projection mura.

The laminated film according to an embodiment having excellent optical properties and/or mechanical properties and/or reducing mura occurrence may include a first layer including a poly(amide-imide) copolymer and a second layer including a poly(amide-imide) copolymer, polyimide, or a combination thereof, which has an amide content of about 30 mole percent (mol %) based on a total number of moles of structural units of the copolymer. The second layer is laminated to at least one surface of the first layer. The poly(amide-imide) copolymer included in the first layer may have a weight average molecular weight of about 30,000 grams/mole to about 200,000 grams/mole, and the polyimide, the poly(amide-imide) copolymer, or the combination thereof included in the second layer may have has a weight average molecular weight of about 10,000 grams/mole to about 50,000 grams/mole.

As described above, the poly(amide-imide) copolymer and polyimide may have a high glass transition temperature, and a viscosity appropriate for the coating process described herein when the copolymers are within the range of stated molecular weight. In one embodiment, the coating process may easily provide a laminated film having excellent optical properties and/or mechanical properties with the use of coating liquids that include each of the respective layer poly(amide-imide) copolymer and/or polyimide having a weight average molecular weight within the above stated range using an in-line coating, and the like.

To be sure the use of an in-line coating process is just one exemplified embodiment in the present specification, and the making of the laminated film is not necessarily limited to the described in-line coating process. In another embodiment, the laminated film may also be fabricated by use of a coating composition for forming a coated first layer, and then using another coating composition for forming the second layer on the first layer by a coating method generally used in the art such as a spin coating, a bar coating, a dipping coating, a spray coating, a roll coating, a knife coating, a casting method, and the like, to provide the laminated film. In addition to the method, it may be manufactured using a suitable coating method generally known or used in the art.

In an embodiment, the poly(amide-imide) copolymer included in the first layer may have a weight average molecular weight of about 30,000 to about 150,000 grams/mole, for example, about 30,000 to about 120,000 grams/mole, about 30,000 to 1 about 00,000 grams/mole, about 35,000 to about 100,000 grams/mole, about 35,000 to about 90,000 grams/mole, about 35,000 to about 85,000 grams/mole, about 40,000 to about 85,000 grams/mole, about 40,000 to about 80,000 grams/mole, about 40,000 to about 78,000 grams/mole, about 40,000 to about 76,000 grams/mole, about 40,000 to about 70,000 grams/mole, about 45,000 to about 80,000 grams/mole, about 45,000 to about 76,000 grams/mole, about 50,000 to about 76,000 grams/mole, about 50,000 to about 68,000 grams/mole, about 55,000 to about 85,000 grams/mole, about 60,000 to about 80,000 grams/mole, or about 60,000 to about 76,000 grams/mole, but is not limited thereto.

In an embodiment, the polyimide or poly(amide-imide) copolymer included in the second layer may have a weight average molecular weight of about 10,000 to about 50,000 grams/mole, about 15,000 to about 40,000 grams/mole, about 15,000 to about 35,000 grams/mole, about 15,000 to about 30,000 grams/mole, about 15,000 to about 28,000 grams/mole, about 20,000 to about 50,000 grams/mole, about 20,000 to about 45,000 grams/mole, about 20,000 to about 40,000 grams/mole, about 20,000 to about 38,000 grams/mole for example, about 20,000 to about 35,000 grams/mole, about 20,000 to about 30,000 grams/mole, about 22,000 to about 35,000 grams/mole, about 22,000 to about 33,000 grams/mole for example, about 22,000 to about 30,000 grams/mole, about 25,000 to about 30,000 grams/mole, or about 25,000 to about 28,000 grams/mole, but is not limited thereto.

The poly(amide-imide) copolymer included in the first layer and the polyimide and/or poly(amide-imide) copolymer included in the second layer may include any poly(amide-imide) copolymer without limiting the type thereof as long as the copolymer may be used for manufacturing an optical film or the like, and has high heat resistance and/or excellent optical properties. Also, the second layer may include a poly(amide-imide) copolymer, a polyimide, or a combination thereof having a refractive index lower than the first layer poly(amide-imide) copolymer.

For example, the first layer may have a refractive index of 1.55 to 1.75, the second layer may have a refractive index of 1.5 to 1.7, and also the poly(amide-imide) copolymer and/or polyimide may be selected so that the second layer has a lower refractive index than the first layer. In this case, the laminated film according to an embodiment does not show a rainbow effect and may improve visibility and optical characteristics.

In an exemplary embodiment, the first layer may have a refractive index of 1.6 to 1.75, for example, 1.65 to 1.72, or 1.67 to 1.7 and the second layer may have a refractive index of 1.5 to 1.7, for example, 1.52 to 1.68, 1.55 to 1.65, about 1.57 to 1.63, 1.58 to 1.61, or 1.58 to 1.6. The refractive index values of the first layer and the second layer may be appropriately selected within the ranges so that the refractive index of the second layer may have a lower refractive index than that of the first layer.

In an embodiment, the poly(amide-imide) copolymer included in the first layer and the polyimide and/or poly(amide-imide) copolymer included in the second layer may each independently include an imide structural unit represented by Chemical Formula 1:

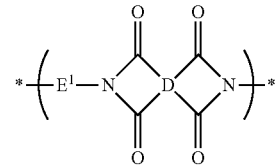

Chemical Formula 1 wherein, in Chemical Formula 1,
D is a substituted or unsubstituted quadrivalent C4 to C30 alicyclic organic group, a substituted or unsubstituted quadrivalent C6 to C30 aromatic organic group, a substituted or unsubstituted quadrivalent C4 to C30 heteroaromatic organic group, or a combination thereof,
the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof, E¹ is a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)₂—, —Si(CH₃)₂—, —(CH₂)$_p$—, —(CF₂)$_q$—, —C(C$_n$H$_{2n+1}$)₂—, —C(C$_n$F$_{2n+1}$)₂—, —(CH₂)$_p$—C(C$_n$H$_{2n+1}$)₂—(CH₂)$_q$—, —(CH₂)$_p$—C(C$_n$F$_{2n+1}$)₂—(CH₂)$_q$— (wherein 1≤n≤10, 1≤p≤10, and 1≤q≤10), —C(CF₃)(C₆H₅)—, —C(=O)NH—, or a combination thereof.

In an embodiment, the poly(amide-imide) copolymer and/or the polyimide may include two or more of the imide structural units represented by Chemical Formula 1 and the two or more imide structural units may each include the same or different D and/or the same or different E¹. That is, the poly(amide-imide) copolymer and/or the polyimide may all include the same imide structural units, or may include a combination of different structural units including different D and/or E¹ for each structural unit.

D of Chemical Formula 1 may be selected from the chemical formulae of Group 1:

Group 1

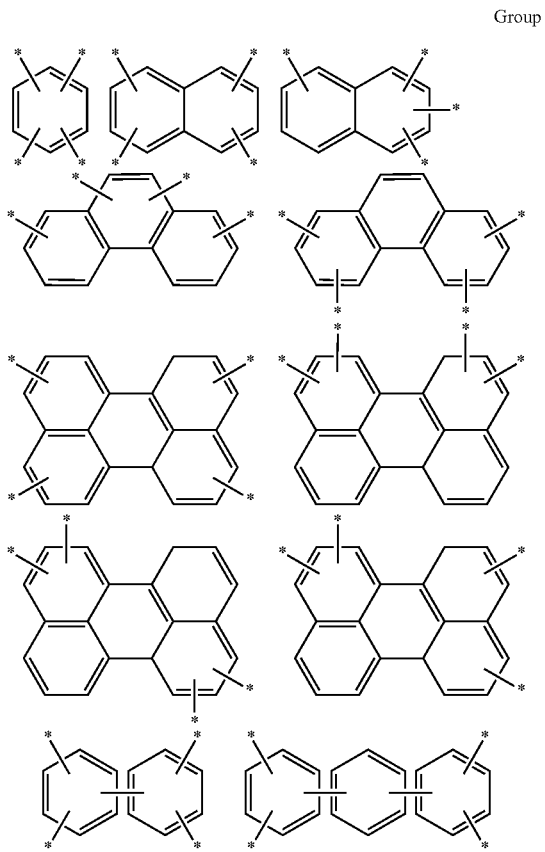

-continued

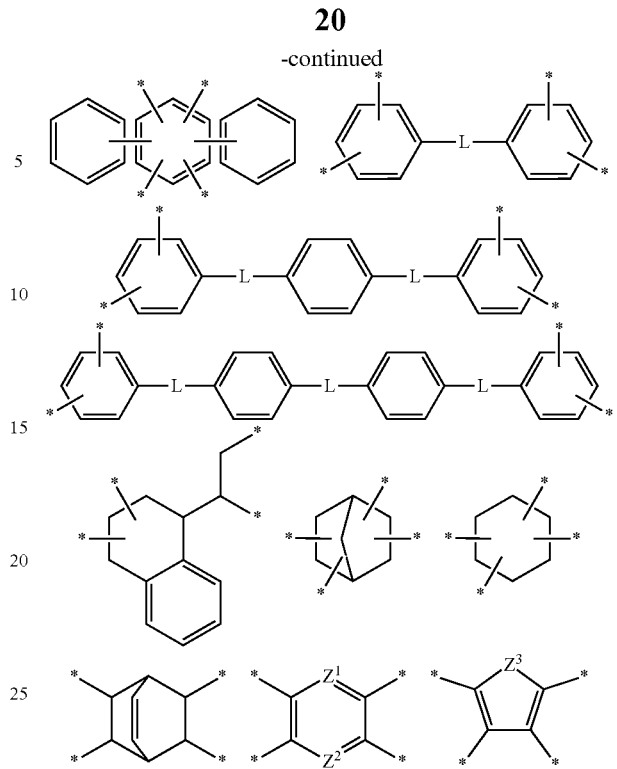

wherein in the above chemical formulae, each moiety may be substituted or unsubstituted, each L is the same or different and is each independently a single bond, a fluorenylene group, —O—, —S—, —C(=O)—, —CH(OH)—, —S(=O)₂—, —Si(CH₃)₂—, —(CH₂)$_p$—, —(CF₂)$_q$—, —C(C$_n$H$_{2n+1}$)₂—, —C(C$_n$F$_{2n+1}$)₂—, —(CH₂)$_p$—C(C$_n$H$_{2n+1}$)₂—(CH₂)$_q$—, —(CH₂)$_p$—C(C$_n$F$_{2n+1}$)₂—(CH₂)$_q$— (wherein 1≤n≤10, 1≤p≤10, and 1≤q≤10), —C(CF₃)(C₆H₅)—, or —C(=O)NH—, is a linking portion with an adjacent atom, Z¹ and Z² are each independently the same or different and are each independently —N= or —C(R¹⁰⁰)=, wherein R¹⁰⁰ is hydrogen or a C1 to C5 alkyl group, provided that Z¹ and Z² are not simultaneously —C(R¹⁰⁰)=, and Z³ is —O—, —S—, or —NR¹⁰¹—, wherein R¹⁰¹ is hydrogen or a C1 to C5 alkyl group.

The chemical formulae of Group 1 may include the chemical formulae of Group 2, but are not limited thereto:

Group 2

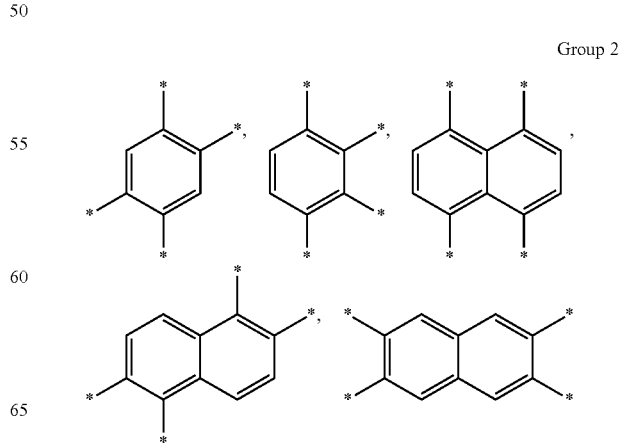

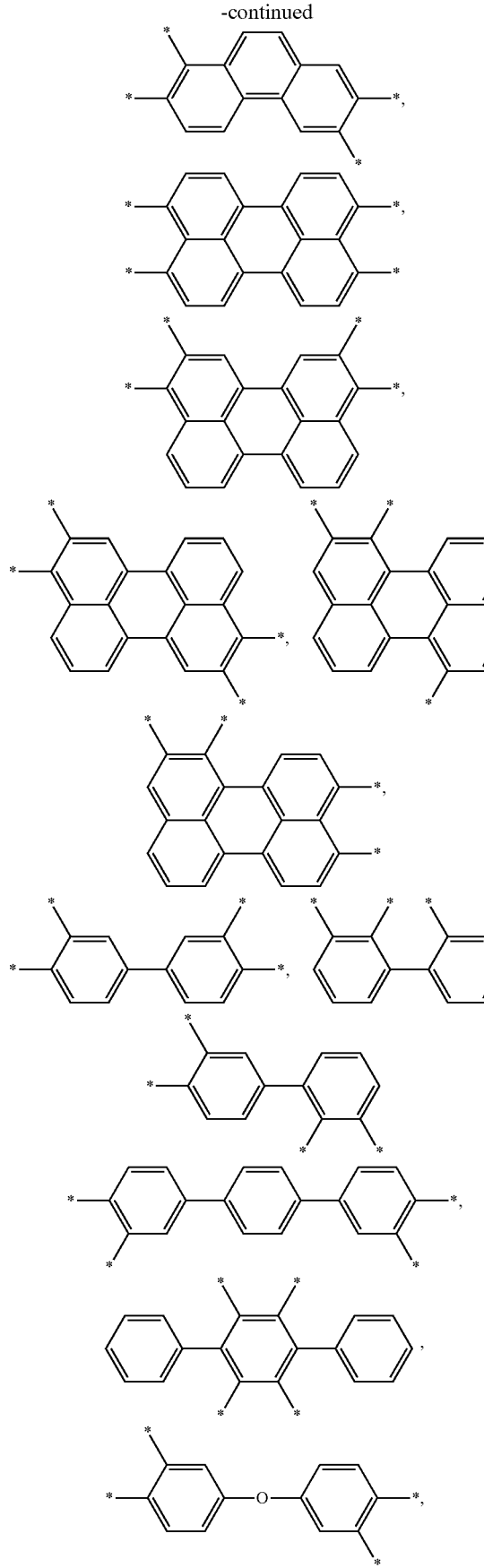
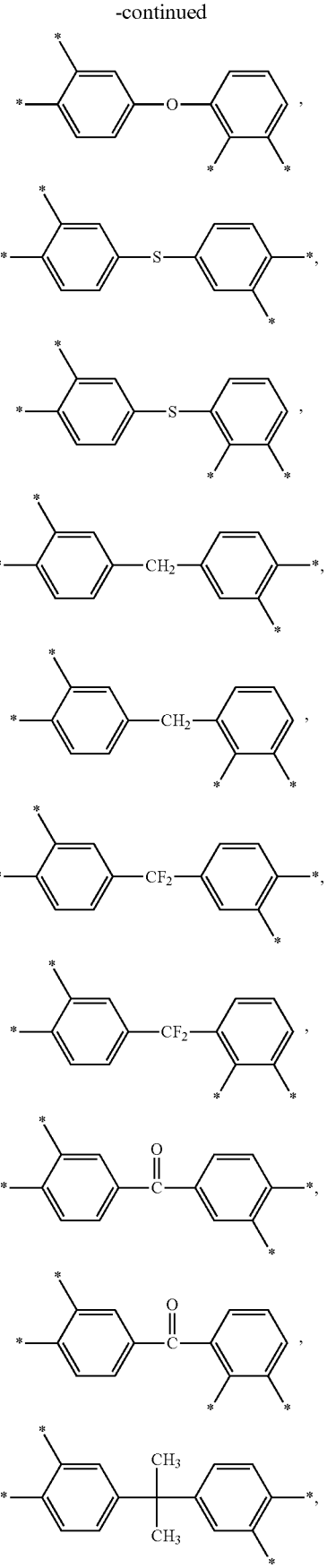

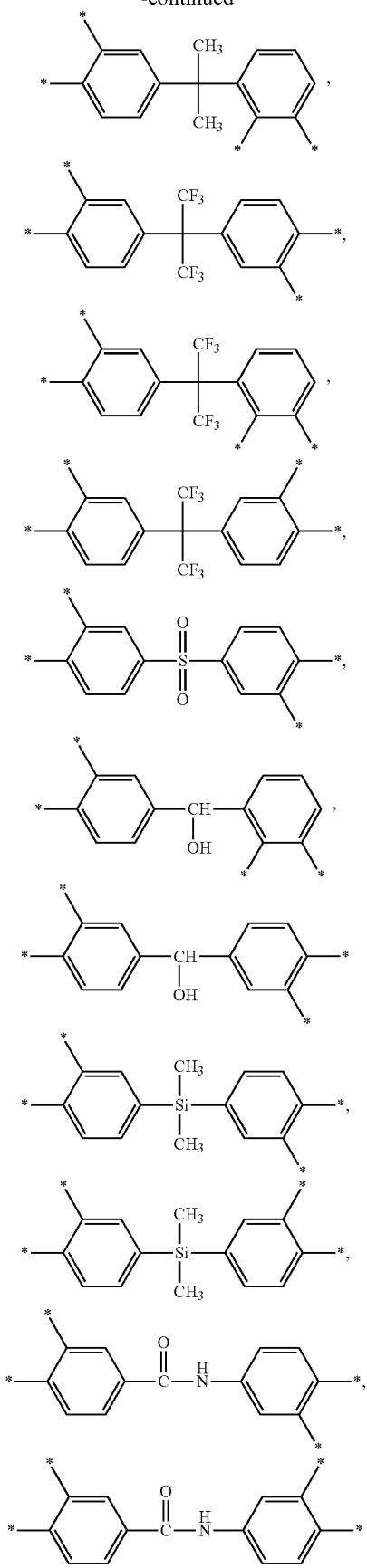

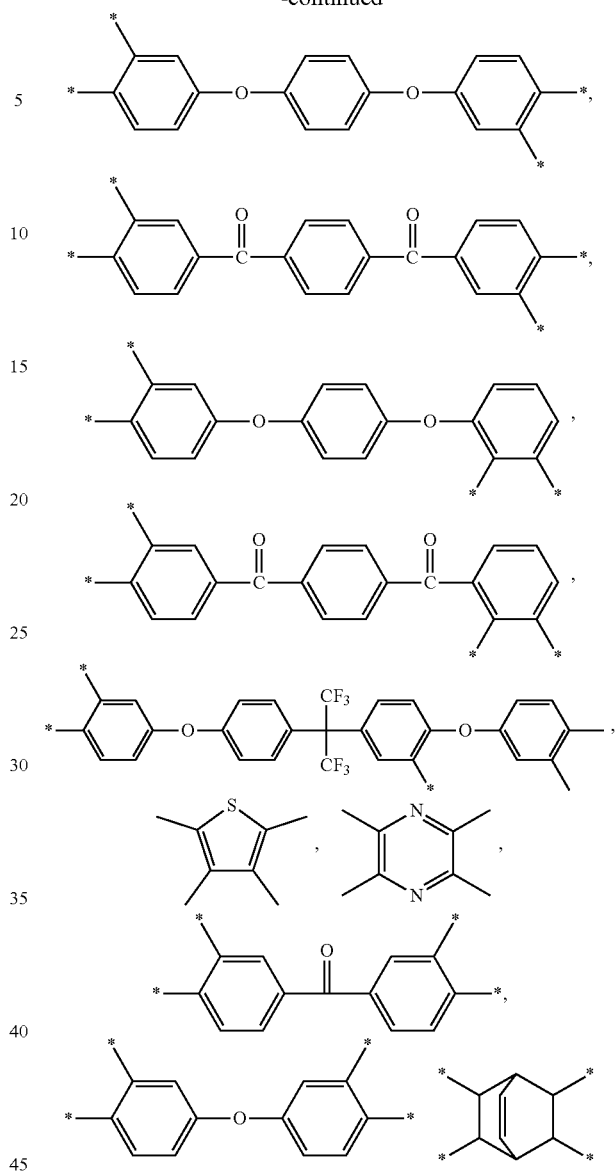

In an embodiment, $E^1$ of Chemical Formula 1 is a substituted or unsubstituted aromatic single ring, a C10 to C30 condensed ring in which substituted or unsubstituted two or more aromatic rings are fused, or at least two aromatic rings independently selected from the single ring or the condensed ring, which are linked with each other by a single bond, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10 and 1≤p≤10), —C(CF$_3$)(C$_6$H$_5$)—, —C(=O)NH—, or a combination thereof. For example, $E^1$ of Chemical Formula 1 may be a group two or more substituted or unsubstituted phenylene groups are linked with a single bond, —O—, —S—, —(CH$_2$)$_p$—, —(CF$_2$)$_q$— (wherein 1≤p≤10 and 1≤q≤10), or a combination thereof. In an embodiment, $E^1$ of Chemical Formula 1 may be a group in which the two or more phenylene groups are substituted with an electron-withdrawing group, for example, a trifluoromethyl group, and are linked by a single bond. Alternatively, $E^1$ of Chemical Formula 1 may be a group in which at least two phenylene groups substituted with a hydroxy group and an alkyl group substituted with a haloalkyl group, for example, a hydroxy group and a methyl group substituted with a trifluoromethyl group are linked by an alkylene group, for example, a methylene group.

In an embodiment, the imide structural unit represented by Chemical Formula 1 may be a group represented by Chemical Formula 1-1:

Chemical Formula 1-1

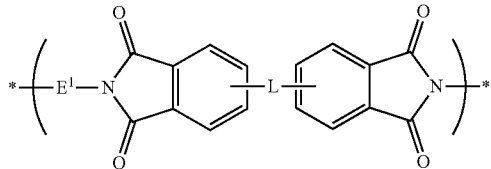

wherein, in Chemical Formula 1-1,
L is a single bond, —$C(C_nF_{2n+1})_2$— (wherein $1 \leq n \leq 10$), or a combination thereof, and
$E^1$ is represented by Chemical Formula 7 or Chemical Formula 8:

Chemical Formula 7

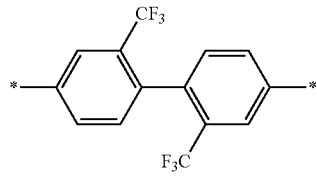

Chemical Formula 8

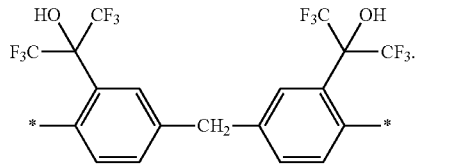

In one embodiment, the poly(amide-imide) copolymer of the first layer and the poly(amide-imide) copolymer of the second layer may further include an amide structural unit represented by Chemical Formula 2:

Chemical Formula 2

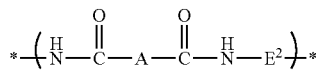

wherein, in Chemical Formula 2,
A and $E^2$ are each independently a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and
the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein $1 \leq n \leq 10$, $1 \leq p \leq 10$, and $1 \leq q \leq 10$), —C(CF$_3$)(C$_6$H$_5$)—, —C(=O)NH—, or a combination thereof.

According to an embodiment, the poly(amide-imide) copolymer may include at least two of amide structure units represented by Chemical Formula 2, and in this instance, A and/or $E^2$ in the amide structural unit may be same as or different from A and/or $E^2$ in another structural unit. In other words, the poly(amide-imide) copolymer may include all the same amide structural units or may include a combination of different structural units including different A and/or $E^2$ in each structural unit.

In an embodiment, A may be a substituted or unsubstituted aromatic single ring, a C10 to C30 condensed ring in which substituted or unsubstituted two or more aromatic rings are fused, or at least two aromatic rings selected from the single ring and the condensed ring, which are linked with each other by a single bond, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein $1 \leq n \leq 10$, $1 \leq p \leq 10$, and $1 \leq q \leq 10$), —C(CF$_3$)(C$_6$H$_5$)—, —C(=O)NH—, or a combination thereof.

In an embodiment, A may be selected from the chemical formulae represented by Group 3:

Group 3

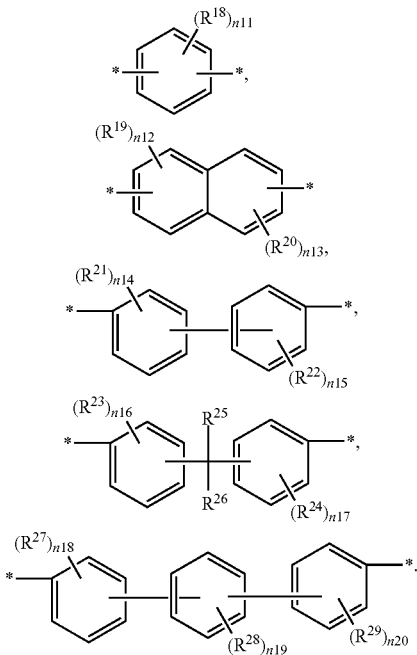

In the above chemical formulae,
$R^{18}$ to $R^{29}$ are the same or different, and are each independently deuterium, a halogen, a substituted or unsubstituted C1 to C10 aliphatic organic group, or a substituted or unsubstituted C6 to C20 aromatic organic group, n11 and n14 to n20 are each independently an integer ranging from 0 to 4, and n12 and n13 are each independently an integer ranging from 0 to 3.

In an embodiment, A may be selected from the chemical formulae represented by Group 4:

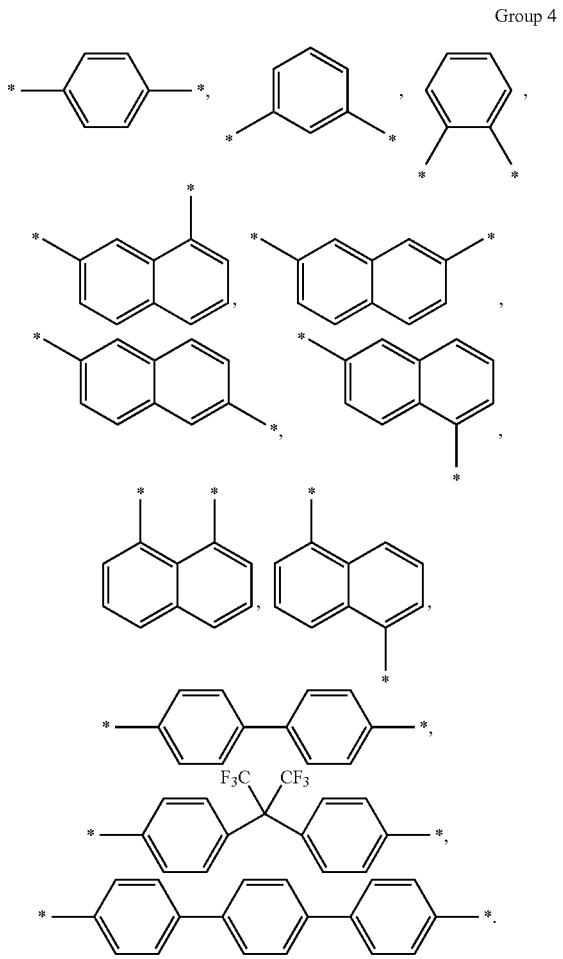

Group 4

In an embodiment, A may be a substituted or unsubstituted phenylene group, a substituted or unsubstituted biphenylene group, or a combination thereof, and for example, A may be an unsubstituted phenylene group.

In an embodiment, $E^2$ of Chemical Formula 2 may be a substituted or unsubstituted aromatic single ring, a C10 to C30 condensed ring in which two or more aromatic rings, substituted or unsubstituted, are fused, or at least two aromatic rings independently selected from the single ring or the condensed ring, which are linked with each other by a single bond, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof.

In an embodiment, $E^2$ of Chemical Formula 2 may be a group in which two or more substituted or unsubstituted phenylene groups are linked with a single bond, —O—, —S—, —(CH$_2$)$_p$—, —(CF$_2$)$_q$— (wherein 1≤p≤10 and 1≤q≤10), or a combination thereof.

In an embodiment, $E^2$ of Chemical Formula 2 may be each independently a group in which at least two phenylene groups are respectively substituted with an electron withdrawing group, for example, a haloalkyl group, for example, a trifluoromethyl group, and are linked by a single bond. Alternatively, $E^2$ may be a group in which at least two phenylene groups are respectively substituted with a hydroxy group and an alkyl group substituted with a haloalkyl group, for example, a hydroxy group and a methyl group substituted with a trifluoromethyl group, and are linked by an alkylene group, for example, a methylene group.

In an embodiment, A of Chemical Formula 2 may be an unsubstituted phenylene group, unsubstituted biphenylene group, or a combination thereof, and $E^2$ may be a group represented by Chemical Formula 7 or a group represented by Chemical Formula 8:

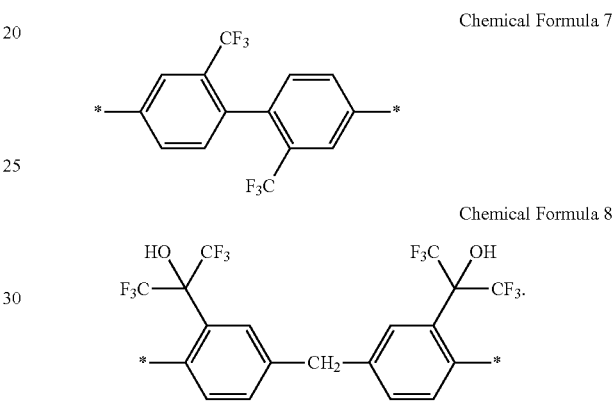

Chemical Formula 7

Chemical Formula 8

In an embodiment, $E^1$ of Chemical Formula 1 and $E^2$ of Chemical Formula 2, may be the group represented by Chemical Formula 7.

In an embodiment, the poly(amide-imide) copolymer of the first layer may include about 30 mol % to about 80 mol % of the amide structural unit, for example, the amide structural unit represented by Chemical Formula 2, based on a total number of moles of structural units in the poly(amide-imide) copolymer.

As the content of the amide structural unit in the poly(amide-imide) copolymer increases more toward the upper end of the mole percent range, mechanical properties such as tensile strength may be enhanced. When the amount of the amide structural unit excessively increases over the 80 mol %, optical properties may deteriorate; and when the amount of the amide structural unit is less than 30 mol %, mechanical properties may deteriorate. In addition, because the polyamide is likely to be a crystalline polymer, solubility to a solvent may deteriorate as the amount of amide structural unit increases. As the poly(amide-imide) copolymer included in the first layer in the laminated film includes the amide structural unit within the above range, the laminated film may maintain excellent mechanical properties and/or optical properties, as well as provide excellent solvent solubility to a solvent when the poly(amide-imide) copolymer of the first layer in within the stated range of weight average molecular weight.

In an embodiment, the poly(amide-imide) copolymer of the first layer may include an amide structural unit, for example, the amide structural unit represented by Chemical Formula 2 in an amount of about 30 mol % to about 75 mol %, for example, about 35 mol % to about 75 mol %, about 40 mol % to about 75 mol %, about 45 mol % to about 75 mol %, about 50 mol % to about 75 mol %, about 55 mol % to about 75 mol %, about 60 mol % to about 75 mol %, about 65 mol % to about 75 mol %, about 70 mol %, about 45 mol % to about 70 mol %, about 45 mol % to about 65 mol %, about 45 mol % to about 60 mol %, about 50 mol % to about 70 mol %, about 55 mol % to about 70 mol %, or about 60 mol % to about 70 mol % based on the number of moles of entire structural units, but is not limited thereto.

Meanwhile, when the second layer of the laminated film includes a poly(amide-imide) copolymer including an amide structural unit, the content of the amide structural unit in the poly(amide-imide) copolymer is less than or equal to about 30 mol %. As described above, when the content of the amide structural unit in the poly(amide-imide) copolymer of the first layer of the laminated film is within a range of about 30 mol % to about 80 mol %, the second layer may include a polyimide that does not include an amide structural unit, or may include a poly(amide-imide) copolymer of which the content of the amide structural unit is less than or equal to about 30 mol %. Accordingly, the content of the amide structural unit in the second layer may be less than or equal to the content of the amide structural unit in the first layer. That is, the content of the amide structural unit in the second layer may be the same as that of the second layer when both layers include amide structural units in each about 30 mol %.

As described above, when including amide structural unit in the above stated mole percent range, mechanical properties of a film may be enhanced, but optical properties may deteriorate. In other words, there may be a trade-off between achieving optimal mechanical properties and achieving optimal optical properties for a particular film. As will be mentioned later, the laminated film according to an embodiment may have a first layer thicker than a second layer, and the first layer may correlate more to the mechanical properties of the laminated film. Thus, the content of the amide structure unit in the poly(amide-imide) copolymer included in the first layer may be greater than that in the poly(amide-imide) copolymer in the second layer. In addition, the laminated film according to an embodiment may be formed by co-extruding two layers by an in-line coating. According to another example embodiment, the laminated film may be obtained by forming the first layer, and then using a coating liquid to form the second layer on the first layer to form the laminated film.

In this case, when the content of the amide structural unit in the coating liquid for forming the second layer is relatively high, the amide structural unit may form a crystalline polymer as mentioned above. However, the crystalline polymer that may form at the interface between the first layer and the second layer may significantly impair the optical properties of the laminated film. For just this reason, the content of the amide structural unit in the poly(amide-imide) copolymer included in the second layer is less than or equal to about 30 mol %. When the content of the amide structural unit in the second layer is less than or equal to about 30 mol %, a laminated film with both excellent optical properties and mechanical properties can be obtained, and in many instances, the resulting film will be without the above-mentioned optical issues.

According to an embodiment, the content of the amide structural unit in a poly(amide-imide) copolymer for forming the second layer is less than or equal to about 30 mol %, less than or equal to about for example, 25 mol %, less than or equal to about for example, 20 mol %, less than or equal to about for example, 15 mol %, less than or equal to about for example, 10 mol %, or less than or equal to about 5 mol %. Moreover, in an exemplary embodiment, the second layer may include polyimide that does not include an amide structural unit.

The laminated film according to an embodiment may have a tensile strength of greater than or equal to 5.5 GPa, for example, greater than or equal to 5.6 GPa, greater than or equal to 5.7 GPa, greater than or equal to 5.8 GPa, greater than or equal to 5.9 GPa, greater than or equal to 6.0 GPa, greater than or equal to 6.1 GPa, greater than or equal to 6.2 GPa, greater than or equal to 6.3 GPa, greater than or equal to 6.4 GPa, greater than or equal to 6.5 GPa, greater than or equal to 6.6 GPa, or greater than or equal to 6.7 GPa but is not limited thereto.

In the laminated film according to an embodiment, a thickness of the first layer may be about 10 micrometers (μm) to about 300 μm, for example, about 15 μm to about 300 μm, about 20 μm to about 300 μm, about 25 μm to about 300 μm, about 30 μm to about 300 μm, about 30 μm to about 250 μm, about 30 μm to about 200 μm, about 30 μm to about 150 μm, about 30 μm to about 100 μm, about 30 μm to about 80 μm, about 30 μm to about 70 μm, about 30 μm to about 60 μm, about 35 μm to about 60 μm, or about 35 μm to about 55 μm, but is not limited thereto.

In the laminated film according to an embodiment, a thickness of the second layer may be about 0.1 μm to about 10 μm, for example, about 0.1 μm to about 8 μm, about 0.1 μm to about 7 μm, about 0.1 μm to about 5 μm, about 0.3 μm to about 5 μm, about 0.5 μm to about 5 μm, about 0.5 μm to about 3 μm, about 0.5 μm to about 2.5 μm, about 0.5 μm to about 2 μm, about 0.5 μm to about 1.5 μm, or about 0.5 μm to about 1 μm, but is not limited thereto.

As described above, the laminated film according to an embodiment may possess excellent mechanical properties as the first layer includes the poly(amide-imide) copolymer including the amide structural unit. Accordingly, in the laminated film according to an embodiment, the first layer may play a role of a support layer, so the first layer will tend to have a thickness greater than the second layer. Accordingly, in the laminated film according to an embodiment, the thickness of the first layer and the second layer may be appropriately selected within the above stated thickness range of the first layer and the second layer, respectively, provided that the first layer is thicker than the second layer. For example, the first layer may have a thickness of about 30 μm to about 100 μm, for example, about 30 μm to about 70 μm, about 40 μm to about 60 μm, and the second layer may have a thickness of about 0.1 μm to about 5 μm, about 0.1 μm to about 3 μm, or about 0.1 μm to about 1 μm, but they are not limited thereto.

The laminated film according to an embodiment not only exhibits or possess excellent mechanical properties, but optical properties as well, such as, transmittance, yellow index, and/or haze. In many instances, the laminated film according to an embodiment may be at least equal to or better than a film made of the first layer or second layer alone in terms of a balance of mechanical and optical properties.

For example, the laminated film according to an embodiment may have a transmittance of greater than or equal to 89%, for example, greater than or equal to 89.1%, greater than or equal to 89.2%, greater than or equal to 89.3%, greater than or equal to 89.4%, greater than or equal to 89.5%, greater than or equal to 89.7%, greater than or equal to 89.9%, greater than or equal to 90%, greater than or equal to 90.1%, greater than or equal to 90.2%, greater than or equal to 90.3%, greater than or equal to 90.4%, greater than or equal to 90.5%, greater than or equal to 90.7%, or greater than or equal to 90.8% in a wavelength range of about 300 nm to about 760 nm, but is not limited thereto.

Also, the YI of the laminated film may be less than or equal to 2.5, for example, less than or equal to 2.4, less than or equal to 2.3, less than or equal to 2.1, less than or equal to 2.0, less than or equal to 1.9, or less than or equal to 1.8, but not limited to these.

Furthermore, the haze of the laminated film may be less than 1.5, for example, less than or equal to 1.4, less than or equal to 1.3, less than or equal to 1.1, less than or equal to 1.0, less than or equal to about 0.9, less than or equal to 0.8, less than or equal to 0.7, less than or equal to 0.6, less than or equal to 0.5, less than or equal to t 0.45, less than or equal to 0.43, less than or equal to 0.41, less than or equal to 0.40, or less than or equal to 0.38, but is not limited thereto.

In addition, the laminated film may be easily obtained by a process such as an in-line process as each of the first layer and the second layer includes poly(amide-imide) copolymer and/or polyimide, both of which has a high glass transition temperature. In addition, when the laminated film is obtained by the inline coating process or the like, an inter-mixing zone where polymeric materials for forming the first layer and the second layer are mixed proximate to the interface of the formed first layer and the formed second layer, so that mura occurrence may be suppressed in the resulting laminated film. In particular, the presence of the inter-mixing zone may minimize the rainbow effect such as interference mura or projection mura or the like at an interface of the first layer and the second layer, so as to provide the obtained laminated film with excellent visibility.

Therefore, the laminated film according to an embodiment may be advantageously used as a window film of a display device such as a display device, for example, or a flexible display device.

Hereinafter, several embodiments of laminated films according to an embodiment will be described with reference to drawings.

FIG. 1 is a cross-sectional view of a laminated film according to an embodiment which is a cross-sectional view showing a laminated film including a first layer 100 including a poly(amide-imide) copolymer and a second layer 200 including poly(amide-imide) copolymer and/or polyimide and disposed on one surface of the first layer 100.

The first layer and the second layer shown in FIG. 1 and the structures of the first layer and the second layer shown in the drawings described below are all the same as described above. Therefore, hereinafter, detailed descriptions of the first layer and the second layer are omitted.

Figure 2:
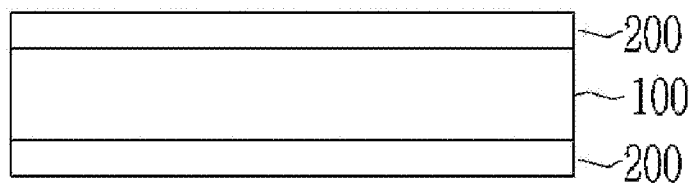
FIG. 2 is a view showing a schematic cross-section of a laminated film in which second layers 200 are laminated on a surface and an opposite surface of a first layer 100 according to an embodiment.

FIG. 2 is a cross-sectional view according to a laminated film according to another embodiment, which is a cross-sectional view of a laminated film in which second layers 200 are each disposed on both surfaces of the first layer 100, differing from FIG. 1.

When the second layers 200 are disposed on both surfaces of the first layer 100, each thickness or component of the second layers disposed on the both surfaces may be different from each other, or may be all the same.

Figure 3:
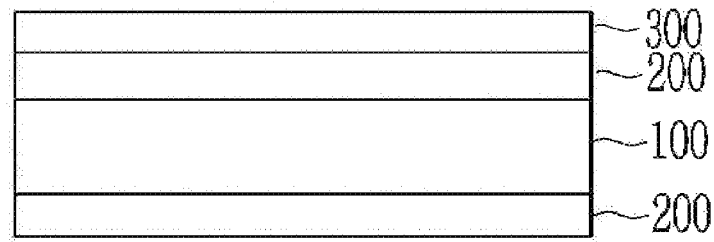
FIG. 3 is a view showing a schematic cross-section of a laminated film in which a hard coating layer 300 is further laminated on one of the two second layers 200 of the laminated film of FIG. 2, according to another embodiment.

FIG. 3 is a cross-sectional view of a laminated film according to another embodiment, which is a cross-sectional view of the laminated film in which the second layers 200 are formed on both surfaces of the first layer 100 as in FIG. 2, and a hard coating layer 3 is further included on either one surface of the second layers.

The hard coating layer 300 applied to the laminated film according to an embodiment may use any known hard coating layer material and is not particularly limited. The hard coating layer may increase a surface hardness of the laminated film.

As a material of the hard coating layer 300, a material that is cured by heat or light may be used, for example, an acrylate-based polymer, a urethane-based polymer, an epoxy-based polymer, a silicone-based polymer, polycaprolactone, a urethane-acrylate copolymer, polyrotaxane, a silica-containing inorganic hard coating material, and the like, but is not limited thereto. The acrylate-based polymer may be a polymer of a monomer mixture including a multi-functional acrylate monomer. Examples of the multi-functional acrylate monomer may be trimethylolpropane triacrylate (TMPTA), trimethylolpropaneethoxy triacrylate (TMPEOTA), glycerine propoxylated triacrylate (GPTA), pentaerythritol tetraacrylate (PETA), and dipentaerythritol hexaacrylate (DPHA), but are not limited thereto. The urethane-based or acrylate-based polymer and the multi-functional acrylate material may exhibit excellent adherence and high productivity.

In an embodiment, the hard coating layer may include the silicon-based polymer and the silicon-based polymer may include organopolysiloxane such as silsesquioxane.

In FIG. 3, the hard coating layer 300 is a single layer, but the hard coating layer may have a multi-layer structure of at least two layers.

A thickness of the hard coating layer 300 may be less than or equal to about 50 μm, for example about 1 μm to about 50 μm, about 1 μm to about 40 μm, about 1 μm to about 30 μm, about 3 μm to about 30 μm, about 5 μm to about 30 μm, about 5 μm to about 25 μm, about 5 μm to about 20 μm, about 5 μm to about 15 μm, or about 5 μm to about 10 μm, but is not limited thereto.

The laminated film according to an embodiment may further include any layer for improving optical properties, mechanical properties, and/or flexural characteristics of the laminated film in addition to the first layer 100, the second layer 200, and the hard coating layer 300 disposed on one surface of the second layer.

Figure 4:
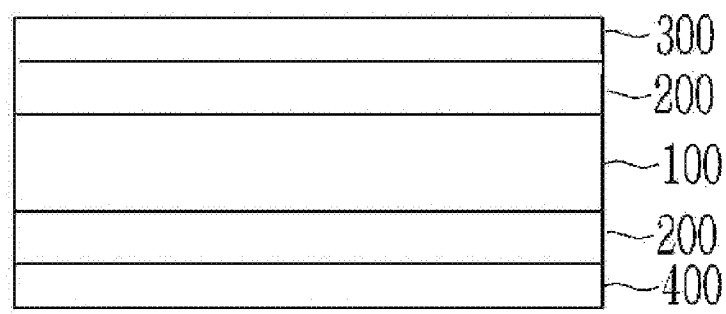
FIG. 4 is a view showing a schematic cross-section of a laminated film in which a coating layer 400 is laminated on a surface of the other second layer where the hard coating layer 300 is not formed in the laminated film of FIG. 3, according to another embodiment.

For example, as shown in FIG. 4, the laminated film according to an embodiment may further include a rear coating layer 400 disposed on the surface opposite to the surface on which the hard coating layer 300 of FIG. 3 is formed, that is, disposed on one surface of the second layer 200 on which the hard coating layer 300 is not formed, wherein the second layer 200 is one of the second layers 200 formed on both surfaces of the first layer 100.

The rear coating layer 400 may include any material as long as it may be optically colorless and transparent, adheres well to an adhesive layer or a superelastic layer that will be described later, and may maintain flexural properties of the laminated film. For example, the rear coating layer 400 may include the same material as the hard coating layer 300 and may use materials for a hard coating layer of a conventional window for a display device without limitation. For example, the rear coating layer 400 may include a (meth)acrylate-based polymer, polycaprolactone, a urethane-acrylate copolymer, polyrotaxane, an epoxy resin, a siloxane copolymer, perfluoropolyether, or a combination thereof.

A thickness of the rear coating layer 400 may be about 30 nm to about 300 nm, for example, about 40 nm to about 200 nm, about 50 nm to about 180 nm, about 60 nm to about 150 nm, about 70 nm to about 130 nm, about 80 nm to about 120 nm, or about 90 nm to about 120 nm, and may be relatively smaller than the hard coating layer 300.

A refractive index of the rear coating layer may be less than or equal to about 1.7, for example, less than or equal to about 1.6, less than or equal to about 1.5, less than or equal to about 1.4, or less than or equal to about 1.3.

The hard coating layer 300 is the same as those described with reference to FIG. 3, and detailed description thereof will be omitted.

Figure 5:
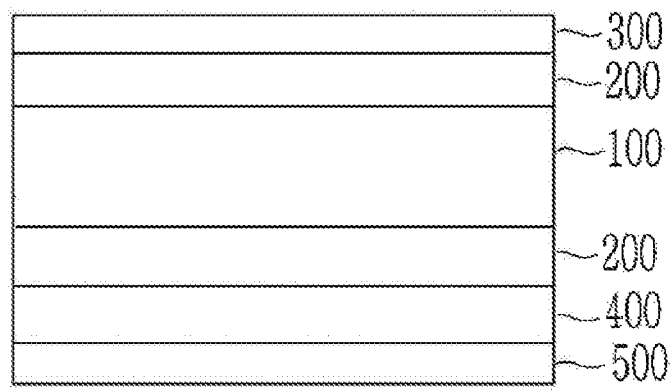
FIG. 5 is a view showing a schematic cross-section of a laminated film in which an adhesive layer or a viscoelastic layer 500 is laminated on the coating layer 400 of the laminated film of FIG. 4, according to another embodiment.

As described above, the laminated film may further include an adhesive layer or a superelastic layer 500 under the rear coating layer 400. FIG. 5 is a view of a structure further including an adhesive layer or a superelastic layer 500 under the rear coating layer 400 of the laminated film of FIG. 4.

Figure 6:
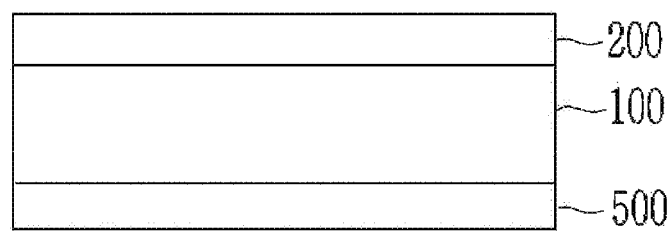
FIG. 6 is a view showing a schematic cross-section of a laminated film in which an adhesive layer or a viscoelastic layer 500 is included on the other surface of the first layer 100 of the laminated film of FIG. 1, according to another embodiment.
Figure 7:
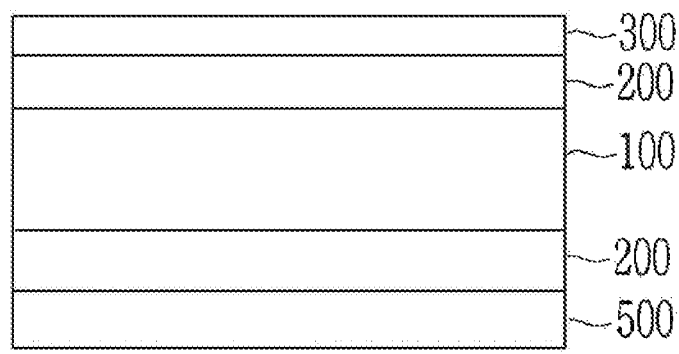
FIG. 7 is a view showing a schematic cross-section of a laminated film in which an adhesive layer or a viscoelastic layer 500 is included on a surface of the second layer 200 where the hard coating layer 300 of the laminated film of FIG. 3 is not formed, according to another embodiment.

Meanwhile, the laminated film according to an embodiment may not include the rear coating layer 400 but further include an adhesive layer or a superelastic layer 500 directly on under portion of the first layer 100 where the second layer 200 is not formed in FIG. 1, or may further include an adhesive layer or a superelastic layer 500 directly on one surface of the second layer 200 wherein the hard coating layer 300 is not formed in FIG. 3. FIGS. 6 and 7 schematically show each of them.

The adhesive layer may include a PSA adhesive, and the superelastic layer may include a superelastic material such as polyurethane, polydimethylsiloxane (PDMS), but they are not limited to.

On the other hand, the adhesive layer or the superelastic layer 500 may cause deterioration of optical characteristics and hardness, so the smaller the thickness of these layers, the better. For example, the thickness of the adhesive layer or the superelastic layer 500 may be less than or equal to about 50 μm, for example, about 10 μm to about 40 μm, or about 10 μm to about 30 μm, but is not limited thereto.

The constitutions of the other laminated films except for the adhesive layer or the superelastic layer 500 are the same as described above, and a detailed description thereof is omitted.

As shown in FIGS. 1 to 7, the laminated films according to embodiments may further include any layer for a desired application, characteristics to be implemented such as the hard coating layer 300, the rear coating layer 400, or the adhesive layer or the superelastic layer 500, and the like, in addition to the first layer 100 and the second layer 200 and thus mechanical properties, optical properties and/or flexural characteristics of the laminated film may be further improved or supplemented. A person skilled in this art will may produce the laminated films according to embodiments by selecting, combining, and modifying known layers including the above-described layers in various forms depending on intended uses and functions and the various forms of selection, combination, and modification are also within the scope of the present disclosure.

The laminated film according to an embodiment including the first layer and the second layer may be obtained by preparing or purchasing a film including poly(amide-imide) copolymer for forming the first layer, and then coating a polyimide-including solution for forming the second layer on one surface of both surfaces of the first layer; or by simultaneously coating a coating solution for the first layer and a coating solution for the second layer according to a method such as in-line coating. The method of coating a coating solution on a film or a substrate to provide a film and the in-line coating method or the like may be performed using the various ways known for a person having an ordinary skill in the art, so the details are omitted.

Another embodiment provides a composition for preparing the laminated film including a first layer and a second layer according to an embodiment that includes a first composition for forming the first layer and a second composition for forming the second layer, wherein the first composition includes a poly(amide-imide) copolymer including an imide structural unit represented by Chemical Formula 1 and an amide structural unit represented by Chemical Formula 2 and having a weight average molecular weight of about 30,000 grams/mole to about 200,000 grams/mole, and the second composition includes polyimide including an imide structural unit represented by Chemical Formula 1 and having a weight average molecular weight of about 10,000 grams/mole to about 50,000 grams/mole, a poly(amide-imide) copolymer including an imide structural unit represented by Chemical Formula 1 and an amide structural unit represented by Chemical Formula 2, and having a weight average molecular weight of about 10,000 grams/mole to about 50,000 grams/mole, or a combination thereof:

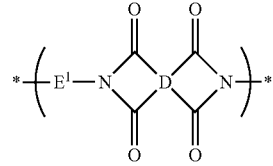

(Chemical Formula 1)

wherein, in Chemical Formula 1,

D is a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof, the alicyclic organic group, the aromatic organic group, or the heteroaromatic organic group, a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof, E$^1$ is a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—

$-(CH_2)_q-$ (wherein 1≤n≤10, 1≤p≤10, and 1≤q≤10), $-C(CF_3)(C_6H_5)-$, $-C(=O)NH-$, or a combination thereof;

Chemical Formula 2

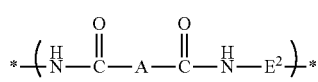

wherein, in Chemical Formula 2,

A and $E^2$ are each independently a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, $-O-$, $-S-$, $-C(=O)-$, $-CH(OH)-$, $-S(=O)_2-$, $-Si(CH_3)_2-$, $-(CH_2)_p-$, $-(CF_2)_q-$, $-C(C_nH_{2n+1})_2-$, $-C(C_nF_{2n+1})_2-$, $-(CH_2)_p-C(C_nH_{2n+1})_2-(CH_2)_q-$, $-(CH_2)_p-C(C_nF_{2n+1})_2-(CH_2)_q-$ (wherein 1≤n≤10, 1≤p≤10, and 1≤q≤10), $-C(CF_3)(C_6H_5)-$, $-C(=O)NH-$, or a combination thereof.

The poly(amide-imide) copolymer and polyimide included in a first composition and a separate second composition are respectively the same as the poly(amide-imide) copolymer and polyimide included in the first layer and the second layer of the laminated film according to an embodiment described above, so the details are not repeated herein.

The first composition and the second composition may be prepared by preparing a poly(amide-imide) copolymer or a polyimide including an amide structural unit represented by Chemical Formula 2, and/or an imide structural unit represented by Chemical Formula 1. According to the method of preparing a poly(amide-imide) copolymer and polyimide each of the poly(amide-imide) copolymer or a polyimide satisfies the above stated weight average molecular weight range are dissolved in an appropriate solvent to make respective coating solutions. Methods well known to persons of ordinary skill in the art can be used to achieve the above polymer materials with the stated weight average molecular weight by appropriately selecting a polymerization reaction time, a type and/or content of monomer, and the like.

The imide structural unit of the polyimide or poly(imide-amide) copolymer may be prepared by a polymerization reaction of a diamine, and a dianhydride or a diisocyanate compound in an organic solvent. The diamine, dianhydride, and diisocyanate are not limited to specific compounds, and any diamine, dianhydride, and diisocyanate compound can be appropriately selected and used as long as a polyimide or a poly(imide-amide) copolymer with the desired optical and mechanical properties suitable for forming the first layer and the second layer of the laminated film according to an embodiment.

Examples of the diamine compound may be hexamethylene diamine; m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl) diphenyl silane; bis(4-aminophenyl) ethyl phosphineoxide; bis(4-aminophenyl) phenyl phosphineoxide; bis(4-aminophenyl)-N-phenyl amine; bis(4-aminophenyl)-N-methylamine; 1,2-diamino-naphthalene; 1,4-diamino-naphthalene; 1,5-diamino-naphthalene; 1,6-diamino-naphthalene; 1,7-diamino-naphthalene; 1,8-diamino-naphthalene; 2,3-diamino-naphthalene; 2,6-diamino-naphthalene; 1,4-diamino-2-methyl-naphthalene; 1,5-diamino-2-methyl-naphthalene; 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 3,3'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichloro-benzene; 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene; 1,4-bis(2-methyl-4-amino-pentyl)-benzene; 1,4-bis(1,1-dimethyl-5-amino-pentyl)-benzene; 1,4-bis(4-aminophenoxy)-benzene; o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantane; bis[2-(3-aminophenyl) hexafluoroisopropyl] diphenyl ether; 3,3'-diamino-1,1,1'-diadamantane; N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl] hexafluoropropane; 2,2-bis[4-(2-chloro-4-aminophenoxy)phenyl hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane; 1,4-bis(3-aminophenyl)buta-1-ene-3-yn; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl] diphenyl ether, diaminocyclohexane, bicyclohexyldiamine, 4,4'-diaminocyclohexylmethane, diaminofluorene, and the like, but are not limited thereto. They may be used alone or as a combination of two or more. Such diamine compounds may be commercially available or may be synthesized by known methods.

For example, the diamine may be compounds with the following structural formulae:

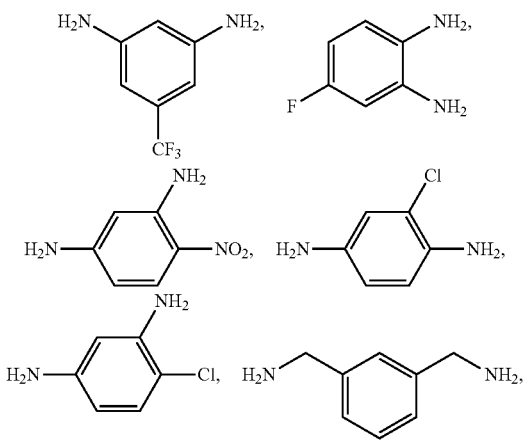

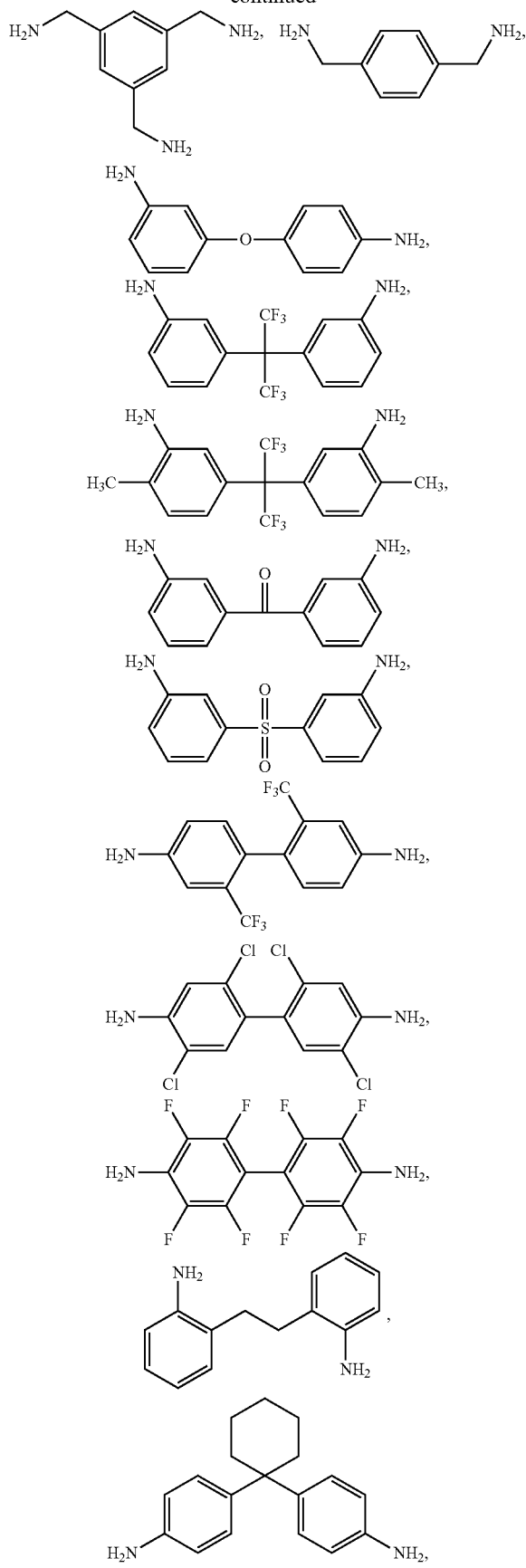

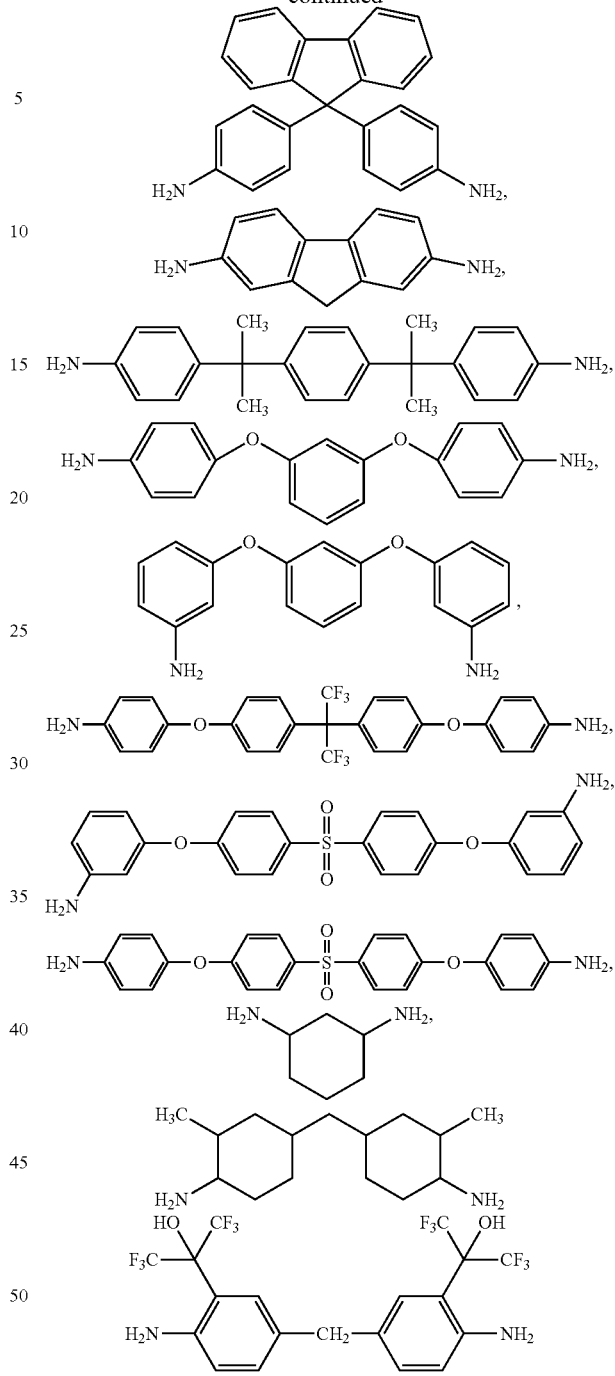

In an embodiment, the diamine may be 2,2'-bis(trifluoromethy)penzidine (TFDB) and/or 3,3'-bis(1-hydroxy-1-trifluoromethyl-2,2,2-trifluoroethyl)-4,4'-methylenedianiline (MFA-MDA).

The dianhydride may be tetracarboxylic dianhydride and examples of these compounds may be at least one selected from 3,3',4,4'-biphenyl tetracarboxylic dianhydride (BPDA), bicycle[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene) diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 3,3',4,4'-biphenyl tetracarboxylic dianhydride; 2,2',3,3'-biphenyl tetracarboxylic dianhydride; 4,4'-bis(3,4-dicarboxphenoxy)diphenyl dianhydride; bis(2,3-dicarboxylphenyl) ether dianhydride; 4,4'-bis(2,3-dicarboxyphenoxy) diphenylether dianhydride; 4,4'-bis(3,4-dicarboxyphenoxy) diphenylether dianhydride; bis(3,4-dicarboxylphenyl) sulfide dianhydride; 4,4'-bis(2,3-dicarboxyphenoxy) diphenylsulfide dianhydride; 4,4'-bis(3,4-dicarboxyphenoxy) diphenyl sulfide dianhydride; bis(3,4-dicarboxylphenyl) sulfone dianhydride; 4,4'-bis(2,3-dicarboxyphenoxy) diphenylsulfone dianhydride; 4,4'-bis(3,4-dicarboxylphenoxy) diphenylsulfone dianhydride; 3,3',4,4"-benzophenone tetracarboxylic acid dianhydride; 2,2',3,3'-benzophenone tetracarboxylic acid dianhydride; 2,3,3'4'-benzophenone tetracarboxylic acid dianhydride; 4,4'-bis(3,4-dicarboxylphenoxy) benzophenone dianhydride; bis(2,3-dicarboxylphenyl) m ethane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride; 1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxylphenoxy) phenyl] propane dianhydride; 2,2-bis [4-(3,4-dicarboxylphenoxy) phenyl] propane dianhydride; 4-(2,3-dicarboxylphenoxy)-4'-(3,4-dicarboxylphenoxy) diphenyl-2,2-propane dianhydride; 2,2-bis[4-(3,4-dicarboxylphenoxy-3,5-dimethyl)phenyl] propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 2,2-bis(3,4-dicarboxylphenyl) hexafluoropropane dianhydride; 1,3-bis(3,4-dicarboxylphenyl) hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy) phenyl] hexafluoropropane dianhydride; 1,1-bis [4-(3,4-dicarboxylphenoxy) phenyl]-1-phenyl-2,2,2-trifluoro ethane dianhydride; and 4,4'-bis[2-(3,4-dicarboxylphenyl) hexafluoroisopropyl] diphenyl ether dianhydride, but are not limited thereto. They may be used alone or as a combination of two or more. Such dianhydride compounds may be commercially available or may be synthesized by known methods.

In an embodiment, the tetracarboxylic dianhydride may include 3,3',4,4'-biphenyl tetracarboxylic dianhydride (BPDA), 4,4'-(hexafluoroisopropylidene)diphthalic anhydride (6FDA), or a mixture thereof.

The organic solvent may be a sulfoxide based solvent such as dimethylsulfoxide, diethylsulfoxide, and the like; a formamide based solvent such as N,N-dimethyl formamide, N,N-diethylformamide, and the like; an acetamide based solvent such as N,N-dimethyl acetamide, N,N-diethylacetamide, and the like; an acetate based solvent such as ethyl acetate (EA), propylene glycol methyl ether acetate (PGMEA), butyl acetate (BA), and the like; a pyrrolidone based solvent such as N-methyl-2-pyrrolidone, N-vinyl-2-pyrrolidone, and the like; a phenol based solvent such as phenol, o-, m- or p-cresol, xylenol, halogenated phenol, catechol, and the like; an ether based solvent such as ethoxy ethanol (EC), propylene glycol methyl ether (PGME), and the like; or a ketone based solvent such as hexamethylphosphoramide, γ-butyrolactone, methyl isobutyl ketone (MIBK), and the like. These may be used alone or in combination. However, the present disclosure is not limited thereto, and aromatic hydrocarbons such as xylene and toluene may be used.

Meanwhile, a known method of preparing a polyamide may include a low temperature solution polymerization method, an interface polymerization method, a melt polymerization method, a solid-phase polymerization method, and the like. Among them, the low temperature solution polymerization method is described as an example. The amide structural unit represented by Chemical Formula 4 may be formed by reacting carboxylic dihalide and diamine in an aprotic polar solvent.

The carboxylic dihalide may be terephthaloyl chloride (TPCl), isophthaloyl chloride (IPCI), biphenyl dicarbonyl chloride (BPCI), naphthalene dicarbonylchloride, terphenyl dicarbonylchloride, 2-fluoro-terephthaloyl chloride, adipoyl chloride, sebacoyl chloride, and the like, but is not limited thereto.

In an embodiment, the carboxylic dihalide may be terephthaloyl chloride (TPCl).

The diamine for forming the amide structure may be the same diamine compound as diamine that may be used to form the imide structure. That is, the amide structure may be formed by using the same or different diamines of the exemplified diamine compounds.

In an embodiment, the diamine for forming the amide structure with the carboxylic dihalide is 2,2'-bis(trifluoromethyl) benzidine (TFDB) and/or 3,3-bis (1-hydroxy-1-trifluoromethyl-2,2,2-trifluoroethyl)-4,4'-methylene dianiline (MFA-MDA).

The aprotic polar solvent may be, for example, a sulfoxide based solvent such as dimethylsulfoxide, diethylsulfoxide, and the like; a formamide based solvent such as N,N-dimethyl formamide, N,N-diethylformamide, and the like; an acetamide based solvent such as N,N-dimethyl acetamide, N,N-diethylacetamide, and the like; a pyrrolidone based solvent such as N-methyl-2-pyrrolidone, N-vinyl-2-pyrrolidone, and the like; a phenol based solvent such as phenol, o-, m- or p-cresol, xylenol, halogenated phenol, catechol, and the like; or hexamethylphosphoramide, γ-butyrolactone, and the like. These may be used alone or in combination. However, the present disclosure is not limited thereto, and aromatic hydrocarbons such as xylene and toluene may be used.

During preparation of the poly(amide-imide) copolymer, the amide structural unit and the imide structural unit may be prepared by reacting diamine and dicarboxylic dihalide for forming an amide structural unit in the same reactor and then adding diamine and dianhydride for forming an imide structural unit to the resulting mixture and additionally reacting them.

Alternatively, an amide oligomer having both terminal ends terminated with an amino group may be prepared by reacting diamine for forming an amide structural unit with a dicarboxylic dihalide, and then the amide oligomer as a diamine monomer may be added to dianhydride to form a poly(amide-amic acid) copolymer. According to the latter method, a precipitation process for removal of HCl generated in the amide forming process may be omitted, a processing time may be shortened, and a yield of the poly(amide-imide) copolymer as a final product may be increased.

The obtained poly(amide-amic acid) copolymer may be prepared through a dehydration ring-closure reaction of amic acid.

As above, the obtained poly(amide-imide) copolymer or polyimide is each dissolved in a solvent in an appropriate concentration to form a coating solution as a first composition for the first layer and a second composition for the second layer. Thus, each of the first composition and the second composition may further include a solvent. The solvents may include an appropriate solvent for coating used for preparing a film including a polyimide or a poly(amide-imide) copolymer in the art, but is not limited to a certain type. The solvent may be a sulfoxide based solvent such as dimethylsulfoxide, diethylsulfoxide, and the like; a formamide based solvent such as N,N-dimethyl formamide, N,N-diethylformamide, and the like; an acetamide based solvent such as N,N-dimethyl acetamide, N,N-diethylacetamide, and the like; an acetate based solvent such as ethyl acetate (EA), propylene glycol methyl ether acetate (PGMEA), butyl acetate (BA), and the like; a pyrrolidone based solvent such as N-methyl-2-pyrrolidone, N-vinyl-2-pyrrolidone, and the like; a phenol based solvent such as phenol, o-, m- or p-cresol, xylenol, halogenated phenol, catechol, and the like; an ether based solvent such as ethoxy ethanol (EC), propylene glycol methyl ether (PGME), and the like; or a ketone based solvent such as hexamethylphosphoramide, γ-butyrolactone, methyl isobutyl ketone (MIBK), and the like. These may be used alone or in combination. However, the present disclosure is not limited thereto, and aromatic hydrocarbons such as xylene and toluene may be used.

As described above, the laminated film according to an embodiment may be obtained by a sequential coating method that the first composition is preliminarily coated on a substrate to provide a first layer, and then the second composition for forming a second layer is coated on at least one surface of the formed first layer to provide a second layer. Alternatively, the laminated film according to an embodiment may be obtained by an in-line coating method of co-extruding the first composition and the second composition. Either of the described methods may be easily performed by the various methods known by a person having ordinary skills in the art, so the details are omitted.

Hereinafter, the embodiments will be described in more detail by examples and comparative examples. The following examples and comparative examples are for illustrative purposes and the scope of the present disclosure is not limited thereto.

EXAMPLES

Synthesis Example 1: Preparation of Oligomer Including 70 Mol % of Amide Structural Unit According to Reaction Scheme 1, an amide structural unit-containing oligomer that forms an aramid structure is prepared by reacting TFDB (2,2'-bis(trifluoromethyl)benzidine) with TPCL (terephthaloyl chloride) as shown in Reaction Scheme 1.

Reaction Scheme 1

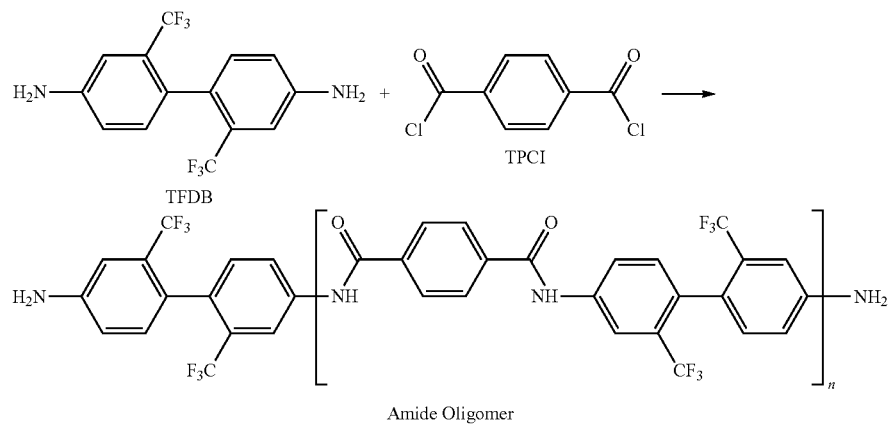

Amide Oligomer

In one instance, 1 molar equivalent (0.122 mol, 39.2 g) of 2,2'-bis(trifluoromethyl)benzidine (TFDB) and 2.8 molar equivalent (0.343 mol, 27.11 g) of pyridine are dissolved in 700 g of N,N-dimethylacetamide in a round-bottom flask, and then the residual TFDB is completely dissolved by further adding 50 ml of dimethyl acetamide (DMAC). 0.7 molar equivalents (0.086 mol, 17.4 g) of terephthaloyl chloride (TPCL) is mixed into the TFDB solution by 4 separate times and vigorously stirred for 15 minutes.

The resultant solution is stirred under the nitrogen atmosphere for 2 hours and then added into 7 liters (L) of NaCl solution containing 350 g of NaCl and stirred for 10 minutes. The solid is filtered and re-suspended with 5 L of deionized water for 2 times and re-filtered. Subsequently, the remained water is removed as much as possible by appropriately pressing the final filtrate on the filter, which is then dried under a vacuum at 90° C. for 48 hours to provide an oligomer including an amide structural unit indicated as "amide oligomer" in Reaction Scheme 1. The number average molecular weight of the obtained oligomer is about 1,400 grams/mole.

Synthesis Example 2: Preparation of Oligomer Including 30 Mol % of Amide Structural Unit As in Synthesis Example 1, 30 mol % of amide structural unit-containing oligomer that forms an aramid structure is prepared by reacting TPCl (terephthaloyl dichloride) and TFDB (2,2'-bis(trifluoromethyl)penzidine). As above, 1 molar equivalent (0.122 mol, 39.2 g) of 2,2'-bis(trifluoromethyl) benzidine (TFDB) and 2.8 molar equivalents (0.343 mol, 27.11 g) of pyridine are dissolved in 700 g of N,N-dimethylacetamide as a solvent in a round-bottom flask, and then the residual TFDB is completely dissolved by further adding 50 ml of dimethyl acetamide (DMAC). 0.3 molar equivalents (0.037 mol, 9.94 g) of terephthaloyl chloride (TPCL) is mixed into the TFDB solution by 4 separate times and vigorously stirred for 15 minutes.

The resultant solution is stirred under the nitrogen atmosphere for 2 hours and then added into 7 L of NaCl solution containing 350 g of NaCl and stirred for 10 minutes. The solid is filtered and re-suspended by 5 L of deionized water for 2 times and re-filtered. Subsequently, the remained water is removed as much as possible by appropriately pressing the final filtrate on the filter and dried under a vacuum at 90° C. for 48 hours to provide an oligomer including 30 mol % of an amide structural unit having a number average molecular weight of about 1,400 grams/mole.

Preparation Example: Preparation of Poly(Amide-Imide) Copolymer or Polyimide

Preparation Example 1: Preparation of Poly(Amide-Imide) Copolymer (PAI-70) Including 70 Mol % of Amide Structural Unit 106 g of dimethyl acetamide (DMAc) is added into 250 ml 4-necked double walled reactor having a mechanical agitator and a nitrogen inlet, and the temperature is adjusted to 25° C., and then 11 g (0.03 mol) of diamine oligomer containing 70 mol % of the amide structural unit prepared from Synthesis Example 1 is added to the reactor, and the solution is maintained at 25° C. Then 2.6 g (0.01 mol) of BPDA and 4.7 g (0.01 mol) of 6FDA are added to the reaction mixture, which is then stirred for 48 hours. 2.3 g of pyridine and 3 g of acetic anhydride are added to the reaction mixture, which is then stirred for 24 hours. The resulting poly(amide-imide) copolymer solution having an amide structural unit content of 70 mol % is obtained. The obtained poly(amide-imide) copolymer has a weight average molecular weight of 76,000 grams/mole as measured by a gel permeation chromatography (GPC) show about.

Preparation Example 2: Preparation of Poly(Amide-Imide) Copolymer (PAI-70) Including 70 Mol % of Amide Structural Unit A poly(amide-imide) copolymer having an amide structural unit content of 70 mol % is prepared in accordance with the same procedure as in Preparation Example 1, except that the polymerization reaction time is adjusted to provide the poly(amide-imide) copolymer with a weight average molecular weight of about 68,000 grams/mole.

Preparation Example 3: Preparation of Poly(Amide-Imide) Copolymer (PAI-30) Including 30 Mol % of Amide Structural Unit 106 g of dimethyl acetamide (DMAc) is added into 250 ml 4-necked double wall reactor having a mechanical agitator and a nitrogen inlet, and the temperature is adjusted to 25° C., and then 11 g (0.03 mol) of diamine oligomer containing 30 mol % of the amide structural unit prepared from Synthesis Example 2 is dissolved therein, and the solution is maintained at 25° C. Then 2.6 g (0.01 mol) of BPDA and 4.7 g (0.01 mol) of 6FDA are added thereto and stirred for 48 hours, and then 2.3 g of pyridine and 3 g of acetic anhydride are added thereto and stirred for 24 hours, so that a poly(amide-imide) copolymer solution having an amide structural unit content of 30 mol % is obtained.

The obtained poly(amide-imide) copolymer has a weight average molecular weight of about 40,000 grams/mole as determined by a gel permeation chromatography (GPC).

Preparation Example 4: Preparation of Polyimide (CPI-01)

120 g of dimethyl acetamide (DMAc) is added into 250 ml 4-necked double wall reactor having a mechanical agitator and a nitrogen inlet, and the temperature is adjusted to 25° C., and then 13.5 g (0.04 mol) of 2,2'-bis(trifluoromethypenzidine, (TFDB) is dissolved therein, and the solution is maintained at 25° C. 2.58 g (0.008 mol) of 3,3',4,4'-biphenyltetracarboxylic dianhydride (BPDA) and 15.6 g (0.035 mol) of 2,2-bis-(3,4-dicarboxyphenyl)hexafluoropropane dianhydride, (6FDA), 0.51 g (0.003 mol) of phthalic anhydride are added to the solution and stirred for 48 hours, and then 5 g of pyridine and 6.46 g of acetic anhydride are added thereto and stirred for 24 hours, so that a polyimide solution is obtained. The obtained polyimide has a weight average molecular weight of about 28,000 grams/mole as determined by a gel permeation chromatography (GPC).

Preparation Example 5: Preparation of Polyimide (CPI-02) Solution

Polyimide is prepared in accordance with the same procedure as in Preparation Example 4, except that the polyimide having a weight average molecular weight of 35,000 grams/mole is prepared by adjusting a content and a polymerization time of each component.

Preparation Example 6: Preparation of Polyimide (CPI-03) Solution

Polyimide is prepared in accordance with the same procedure as in Preparation Example 4, except that the polyimide has a weight average molecular weight of 60,000 grams/mole.

Preparation Example 7: Preparation of Solution for Forming Hard Coating Layer

Preparation Example 7-1: Preparation of Silsesquioxane 20 ml of ethanol (Samchun Chemicals) and 17.5 g of 1 wt %-diluted tetramethylammonium hydroxide solution (TMAH: Sigma-Aldrich) are added to 100 ml double jacket reaction and mixed. 26.5 ml of (3-glycidyloxypropyl) trimethoxysilane (Sigma-Aldrich) is added while mixing them and the mixture is stirred at room temperature for 6 hours. Subsequently, the temperature is increased up to 60° C., and 40 ml of toluene (Sigma-Aldrich) is added to the mixture, which is then mixed for 6 hours. When completing the mixing, the reaction products solution is washed using a saturated sodium chloride solution (Samchun Chemicals), and the remaining moisture is removed using sodium sulfate anhydrous (Samchun Chemicals). Subsequently, any residue of solvent such as toluene that remained in the reaction product is removed using an evaporator (Daihan Scientific Co., Ltd.) and a vacuum oven (Daihan Scientific Co., Ltd.).

Preparation Example 7-2: Preparation of Silsesquioxane 20 ml of ethanol (Samchun Chemicals) and 17.5 g of 1 wt %-diluted tetramethylammonium hydroxide (TMAH, Sigma-Aldrich) solution are added into 100 ml double jacket reactor and mixed. While stirring, 18.2 ml of [8-(glycidyloxy)-n-octyl]trimethoxysilane (TCI) is added to the reactor and mixed at a room temperature for 6 hours. Subsequently, the temperature is increased up to 60° C., and 40 ml of toluene (Sigma-Aldrich) is added to the mixture and mixed for 6 hours. When completing the mixing, the reaction products solution is washed using a saturated sodium chloride solution (Samchun Chemicals), and the remaining moisture is removed using sodium sulfate anhydrous (Samchun Chemicals). Any solvent such as toluene that remained in the reaction product is removed using an evaporator (Daihan Scientific Co., Ltd.) and a vacuum oven (Daihan Scientific Co., Ltd.).

Preparation Example 7-3: Preparation of Hard Coating Solution

Silsesquioxane obtained from Preparation Example 7-1, silsesquioxane obtained from Preparation Example 7-2, and a cation polymerizable organic compound represented by Chemical Formula A are added to methylisobutylketone at a weight ratio of 40:40:20 and stirred. The amount (solid content) of silsesquioxane obtained from Preparation Example 7-1, silsesquioxane obtained from Preparation Example 7-2, and a cation polymerizable organic compound represented by Chemical Formula A is 50% based on the total weight of the solution. A cation initiator of Irgacure 250 (BASF) is added thereto in 2 parts by weight based on 100 parts by weight of the solid, and a surface characteristic controlling agent of KY-1203 (Shin-Etsu) is added thereto in 0.1 parts by weight based on 100 parts by weight of the solid and uniformly mixed to provide a hard coating solution.

Chemical Formula A

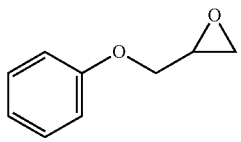

A refractive index of the hard coating layer made from the hard coating solution prepared according Preparation Example is 1.5. The refractive index is set to the Gen-Osc model in a visible region with an Ellipsometer (M-2000, J. A. Woollam), and the value at a wavelength of 550 nm is taken.

Examples and Comparative Examples: Preparation of Laminated Film (1) Preparation of Poly(Amide-Imide) Copolymer Film Each of the poly(imide-amide) copolymer solutions obtained in Preparation Example 1 to Preparation Example 3 is coated on a glass plate and casted and dried on a hot plate at 80° C. for one hour to remove the solvent, and then the coated glass plate is input into an oven and heated at a temperature rate of 3° C. per a minute from room temperature to 250° C. Subsequently, it is slowly cooled, and finally, the poly(imide-amide) copolymer film is separated from the glass plate to obtain the poly(imide-amide) copolymer film having each thickness of about 50 μm.

(2) Preparation of Laminated Film

The poly(amide-imide) copolymer film obtained from (1) is formed as a first layer, and each of polyimide or poly(imide-amide) copolymers prepared from Preparation Examples 2 to 6 is dissolved in butyl acetate (BA), methyl isobutyl ketone (MIBK), or PGMEA (propylene glycol methyl ether acetate or 1-methoxy-2-propanol acetate) to provide a solution and coated onto the first layer by a bar-coating. Then, the solvent is removed in a drying oven to provide a polymer film having a thickness of about 1 μm, so as to provide a laminated film with a second layer formed on the first layer as a single layer.

Meanwhile, the first layer film is dipped in each of solutions prepared by dissolving each of the polyimide or poly(imide-amide) copolymers obtained from Preparation Examples 2 to 6 in butyl acetate (BA), methyl isobutyl ketone (MIBK), or PGMEA (propylene glycol methyl ether acetate or 1-methoxy-2-propanol acetate), and then the solvent is removed in a drying oven to provide a polymer film as in above to provide a polymer film having a thickness of about 1 μm on each of both surfaces of the first layer. A laminated film in which second layers are formed on both surfaces of the first layer is obtained.

In addition, on a surface of the second layer in the laminated film having the second layer on a single surface or, in the laminated film having the second layers on both surfaces of the first layer, a hard coating layer having a thickness of 10 μm is formed by bar-coating with a solution prepared from Preparation Example 7-3. The removal of solvent from the same in a drying oven, and curing the same at 380 milliJoules per square centimeter ($mJ/cm^2$) using a UV curing apparatus (LC6B, Fusion UV).

In addition, a laminated film in which a hard coating layer and a PSA adhesive layer are laminated is prepared by bar-coating a PSA adhesive agent layer or laminating a mass film coated with a PSA adhesive agent on one opposing surface of the laminated film to the hard coating layer.

Table 1 shows a type of the films for forming a first layer and a second layer of each laminated film as in above. As indicated, laminated films having a second layer formed on only one surface (single surface) of the first layer or formed on both surfaces of the first layer were prepared. The type of the solvent used when forming the second layer in indicated by the list of working examples and comparative examples.

Comparative Example 1 is a film formed with a single layer of poly(amide-imide) copolymer prepared from Preparation Example 2, and Comparative Example 2 is a film formed with a single layer of polyimide prepared from Preparation Example 4.

In addition, the films obtained from examples and comparative examples are evaluated for optical properties, mechanical properties, and glass transition temperature, and the results are also shown in Table 1. Specifically, transmittance, yellow index (YI), haze, and refractive index are measured as optical properties of the film, and tensile strength is measured as mechanical properties, and each of them is measured according to one of the following methods.

(1) Yellow index (YI) and transmittance (Tr (%), transmittance in a range of 300 nm to 760 nm) are measured with reference to a film having a thickness of about 50 μm using a spectrophotometer manufactured by Minolta, CM-3600d, and the results are obtained according to ASTM D1925.

(2) The haze is measured using a spectrophotometer manufactured by Minolta, CM-3600d, and the results are obtained according to ASTM D1003-97.

(3) The refractive index is set to the Gen-Osc model in a visible region with an Ellipsometer (M-2000, J. A. Woollam), and the value at a wavelength of 550 nm is taken.

(4) The tensile strength of the film is measured according to ASTM D882.

(5) The glass transition temperature (Tg) of the film is measured in a temperature range of 50° C. to 400° C., at a fixed tension force of 0.05 Newtons (N), at a temperature increasing rate of 5° C./min using a thermal mechanical analyzer (TMA Q400, TA Instruments).

to Preparation Example 2 is not dissolved in a solvent for forming the second layer, so that the laminated film was not obtained.

In addition, a laminated film according to Comparative Example 4 having a first layer including the poly(amide-imide) copolymer having the same weight average molecular weight as in the above examples and a second layer including the polyimide prepared from Preparation Example 6 having the weight average molecular weight of 60,000 grams/mole which is greater than 50,000 grams/mole shows a transmittance of 87.85% which is lower than the films

TABLE 1

| | Resin of first layer | Resin of second layer | Coating surface | Type of solvent | Tg (° C.) | Tr @ Total (%) | YI | Haze | Tensile strength @ 50 μm (GPa) | Ref. index |
|---|---|---|---|---|---|---|---|---|---|---|
| Example 1 | Preparation Example 1 | Preparation Example 4 | Both | BA | 345 | 90.11 | 1.79 | 0.38 | 6.6 | 1.61 |
| Example 2 | Preparation Example 2 | Preparation Example 3 | Both | BA | 360 | 89.97 | 1.94 | 0.43 | 6.7 | 1.6 |
| Example 3 | Preparation Example 3 | Preparation Example 4 | Both | BA | 345 | 90.87 | 1.82 | 0.4 | 5.7 | 1.61 |
| Example 4 | Preparation Example 1 | Preparation Example 4 | One | BA | 345 | 89.12 | 2.14 | 0.67 | 6.6 | 1.61 |
| Example 5 | Preparation Example 1 | Preparation Example 4 | One | MIBK | 345 | 89.26 | 2.14 | 0.37 | 6.7 | 1.6 |
| Example 6 | Preparation Example 1 | Preparation Example 4 | Both | MIBK | 345 | 89.78 | 2.24 | 1.39 | 6.6 | 1.61 |
| Example 7 | Preparation Example 1 | Preparation Example 4 | One | PGMEA | 345 | 89.21 | 2.18 | 0.41 | 6.6 | 1.6 |
| Example 8 | Preparation Example 2 | Preparation Example 5 | One | BA | 330 | 89.95 | 2.24 | 0.56 | 6.4 | 1.58 |
| Example 9 | Preparation Example 2 | Preparation Example 5 | Both | BA | 330 | 90.43 | 2.34 | 0.98 | 6.3 | 1.57 |
| Comparative Example 1 | Preparation Example 2 | — | — | — | 350 | 88.66 | 2.3 | 0.44 | 6.3 | 1.68 |
| Comparative Example 2 | Preparation Example 4 | — | — | — | 345 | 90.2 | 2.1 | 0.56 | 4.0 | 1.60 |
| Comparative Example 3 | Preparation Example 2 | Preparation Example 2 | One | BA | | | Non-soluble | | | |
| Comparative Example 4 | Preparation Example 2 | Preparation Example 6 | One | BA | 345 | 87.85 | 3.06 | 3.5 | 6.5 | 1.6 |
| Comparative Example 5 | Preparation Example 2 | Preparation Example 6 | One | MIBK | 345 | 88.17 | 2.8 | 3.98 | 6.6 | 1.6 |

As indicated in the data of Table 1, the laminated films according to Examples 1 to 9 in which the first layers and the second layers each including poly(amide-imide) copolymers and/or polyimides within the weight average molecular weight ranges according to an embodiment show an average transmittance of greater than or equal to 89% at a wavelength range of 300 nm to 760 nm, a YI of less than or equal to 2.5, a haze of less than 1.5, which are overall excellent optical properties, and also show a tensile strength of greater than or equal to 5.7, which is an excellent mechanical property. In addition, although not shown in Table 1, the laminated films according to Examples 1 to 9 tend not to exhibit a rainbow effect, and so the visibility is excellent.

In contrast, the laminated film according to Comparative Example 3 having a first layer including the poly(amide-imide) copolymer having the same weight average molecular weight as in the above examples and a second layer including the poly(amide-imide) copolymer according to Preparation Example 2 having a weight average molecular weight of 68,000 grams/mole and an amide structural unit content of 70 mol %, which is the same as in the first layer, was prepared, the poly(amide-imide) copolymer according to according all Examples, high YI of greater than 3, and haze of 3.5%, which are significantly deteriorated optical properties.

Meanwhile, it is confirmed that the film according to Comparative Example 1 including a single layer of the poly(amide-imide) copolymer prepared from Preparation Example 2 having an amide structural unit content of 70 mol % and a weight average molecular weight of 68,000 grams/mole shows excellent mechanical properties but shows lower optical properties than the laminated films according to Examples 1 to 9. On the other hand, the film according to Comparative Example 2 including a single layer of the polyimide according to Preparation Example 4 shows excellent optical properties, however the film also exhibits low mechanical properties such as tensile strength.

As described above, the laminated film according to an embodiment having a first layer including poly(amide-imide) copolymer having a weight average molecular weight of 30,000 to 200,000 grams/mole and a second layer including polyimide having a weight average molecular weight of 10,000 to 50,000 grams/mole or poly(amide-imide) copolymer within the molecular weight range and having an amide structural unit content of less than or equal to 30 mol % may maintain same or more excellent mechanical properties than the film according to Comparative Example 1 and also may have same or more excellent optical properties than the film according to Comparative Example 2, an improvement of both mechanical properties and optical properties. Accordingly, the laminated film may be usefully used as a window for a flexible display device.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A laminated film comprising a first layer, and a second layer laminated to at least one surface of the first layer,
   the first layer comprising a poly(amide-imide) copolymer having a weight average molecular weight of about 50,000 grams/mole to about 100,000 grams/mole, and
   the second layer comprising a poly(amide-imide) copolymer, polyimide, or a combination thereof having a weight average molecular weight of about 10,000 grams/mole to about 45,000 grams/mole, wherein an amide content of the poly(amide-imide) copolymer included in the second layer is less than or equal to about 30 mol % based on a total number of moles of structural units of the poly(amide-imide) copolymer.

2. The laminated film of claim 1, wherein the second layer has a lower refractive index than the first layer.

3. The laminated film of claim 1, wherein the poly(amide-imide) copolymer of the first layer, and the poly(amide-imide) copolymer or polyimide of the second layer, each independently comprises an imide structural unit represented by Chemical Formula 1:

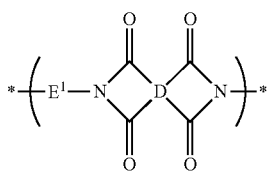

Chemical Formula 1 wherein, in Chemical Formula 1,

D is a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof, wherein in D the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof, $E^1$ is a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and wherein in $E^1$ the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof.

4. The laminated film of claim 3, wherein D of Chemical Formula 1 is of the chemical formulae of Group 1:

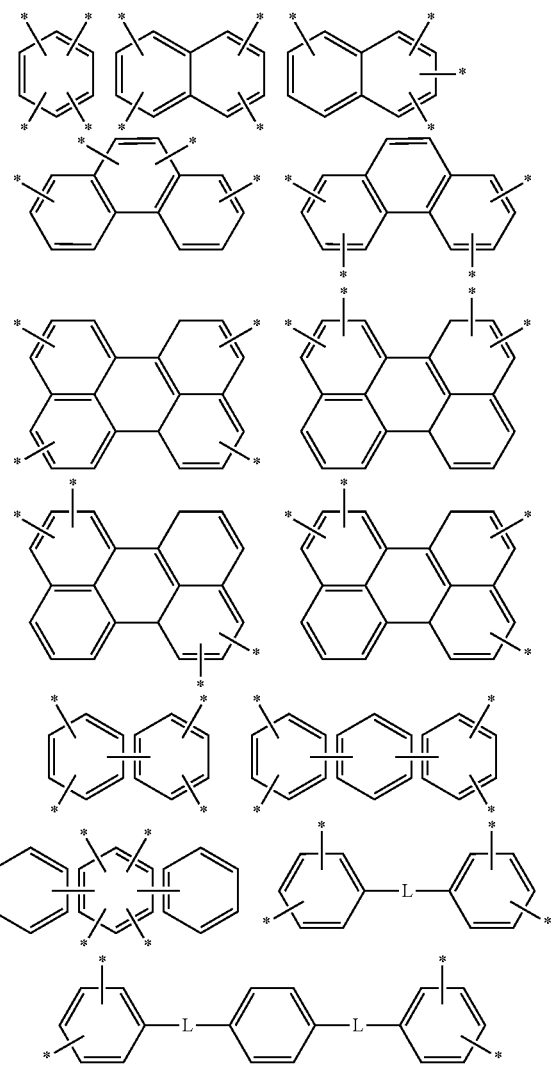

Group 1

-continued

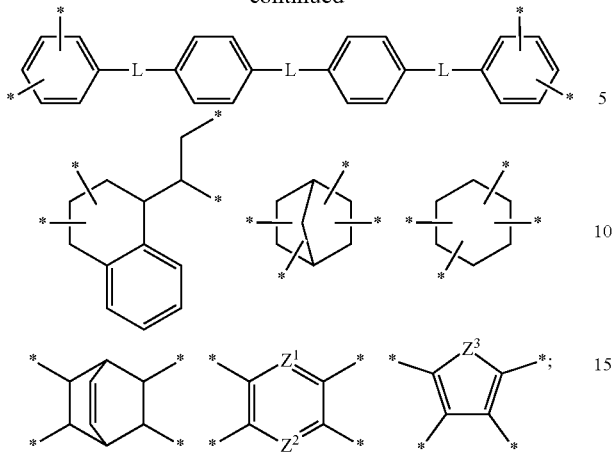

wherein in the above chemical formulae, each moiety may be substituted or unsubstituted, each L is the same or different and is each independently a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, or —C(=O)NH—,

* is a linking portion with an adjacent atom,

Z$^1$ and Z$^2$ are each independently the same or different and are each independently —N= or) —C(R$^{100}$)=, wherein R$^{100}$ is hydrogen or a C1 to C5 alkyl group, provided that Z$^1$ and Z$^2$ are not simultaneously) —C(R$^{100}$)=, and Z$^3$ is —O—, —S—, or —N$^{101}$—, wherein R$^{101}$ is hydrogen or a C1 to C5 alkyl group.

5. The laminated film of claim 3, wherein D of Chemical Formula 1 is of the chemical formulae of Group 2:

Group 2

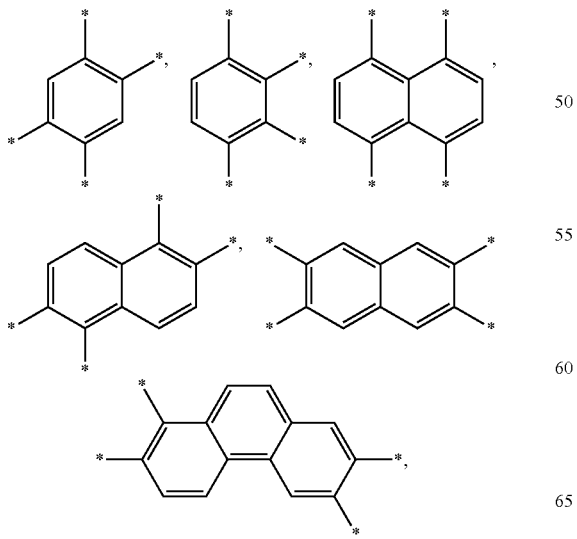

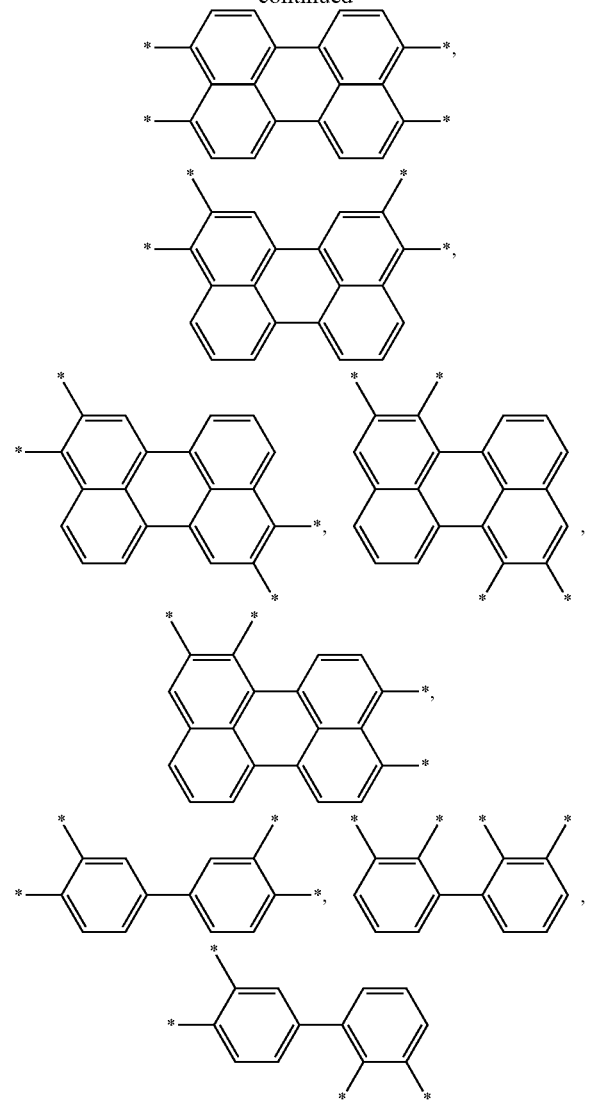

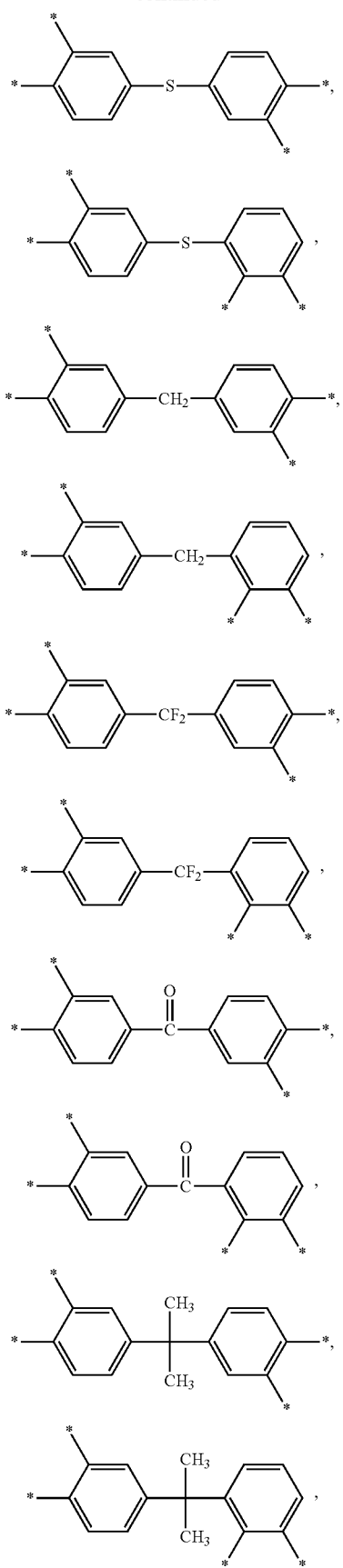
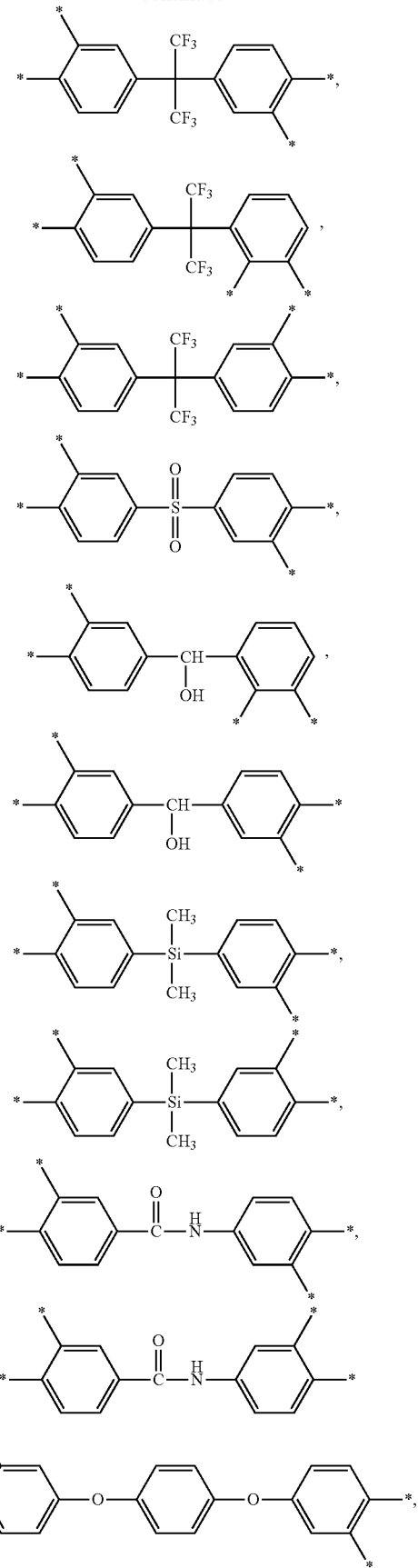

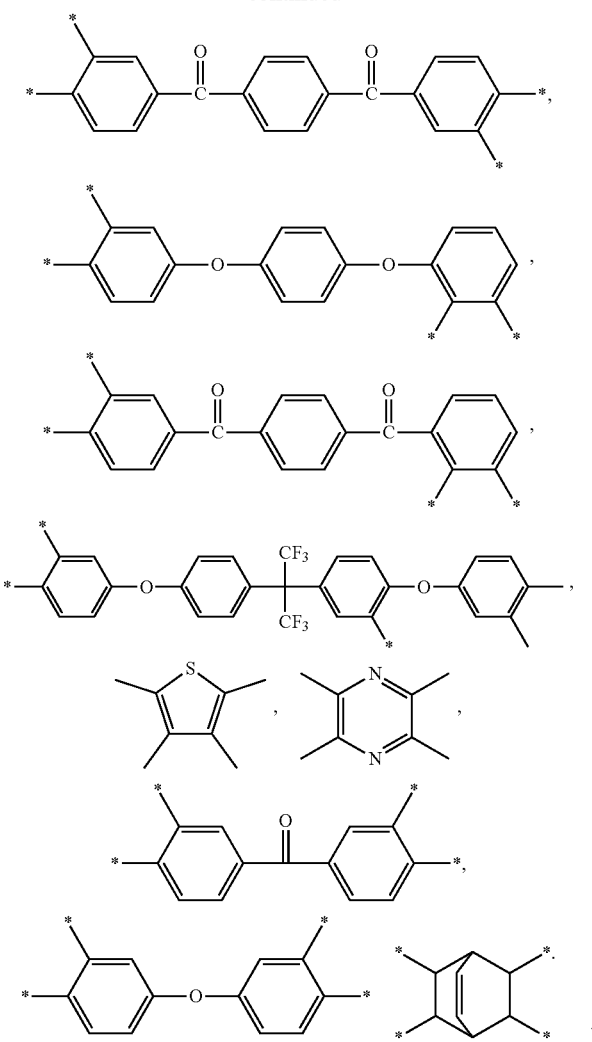

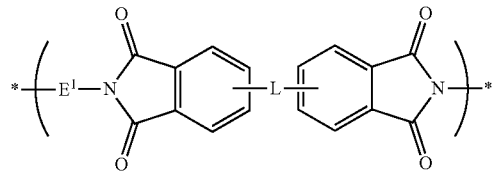

wherein, in Chemical Formula 1-1,
L is a single bond, —C(C$_n$F$_{2n+1}$)$_2$— (wherein 1≤n≤10), or a combination thereof, and
E$^1$ is represented by Chemical Formula 7 or Chemical Formula 8:

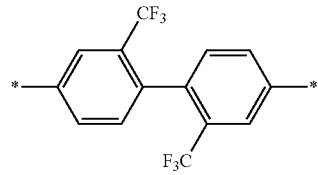

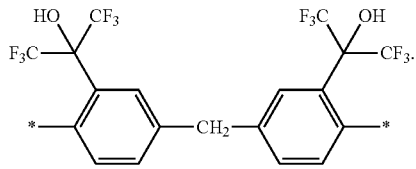

9. The laminated film of claim 3, wherein the poly(amide-imide) copolymer of the first layer and second layer comprises an amide structural unit represented by Chemical Formula 2:

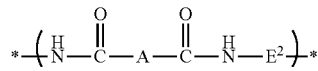

wherein, in Chemical Formula 2,
A and E$^2$ are each independently a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and
the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—,
—C(═O)—, —CH(OH)—, —S(═O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—,
—(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(═O)NH—, or a combination thereof.

6. The laminated film of claim 3, wherein E$^1$ of Chemical Formula 1 is a substituted or unsubstituted aromatic single ring, a substituted or unsubstituted C$_{10}$ to C$_{30}$ condensed ring in which two or more aromatic rings are fused, or at least two aromatic rings selected from the single ring and the condensed ring, which are linked with each other by a single bond, —O—, —S—, —C(═O)—, —CH(OH)—, —S(═O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(═O)NH—, or a combination thereof.

7. The laminated film of claim 3, wherein E$^1$ of Chemical Formula 1 is a group in which two or more phenylene groups, independently unsubstituted or substituted, are linked with a single bond, —O—, —S—, —(CH$_2$)$_p$—, —(CF$_2$)$_q$— (wherein 1≤p≤10 and 1≤q≤10), or a combination thereof.

8. The laminated film of claim 3, wherein the imide structural unit represented by Chemical Formula 1 is a group represented by Chemical Formula 1-1:

10. The laminated film of claim 9, wherein A of Chemical Formula 2 is of chemical Formula of Group 3:

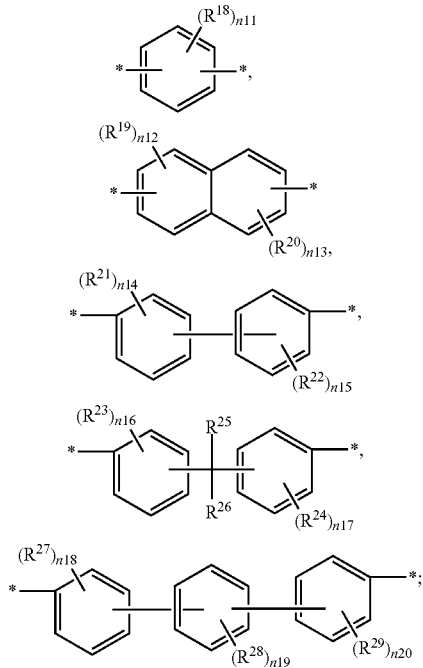

Group 3 wherein, in the above chemical formulae, $R^{18}$ to $R^{29}$ are the same or different, and are each independently deuterium, a halogen, a substituted or unsubstituted C1 to C10 aliphatic organic group, or a substituted or unsubstituted C6 to C20 aromatic organic group, n11 and n14 to n20 are each independently an integer ranging from 0 to 4, and n12 and n13 are each independently an integer ranging from 0 to 3.

11. The laminated film of claim 9, wherein A of Chemical Formula 2 is of chemical formulae represented by Group 4:

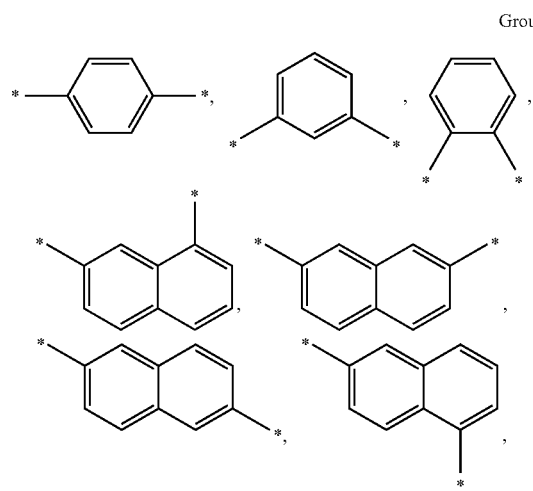

Group 4

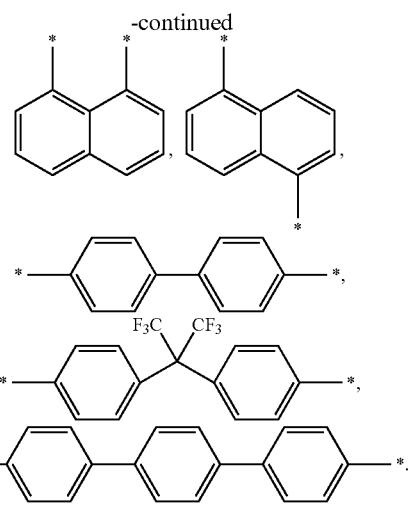

-continued

12. The laminated film of claim 9, wherein $E^2$ of Chemical Formula 2 is a substituted or unsubstituted aromatic single ring, a substituted or unsubstituted C10 to C30 condensed ring in which two or more aromatic rings are fused, or at least two aromatic rings independently selected from the single ring or the condensed ring, which are linked with each other by a single bond, —O—, —S—, —C(=O)—, —CH(OH)—, —S(=O)$_2$—,
—Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—,
—(CH$_2$)$_p$—C(C$_n$F$_{2n+1}$)$_2$—(CH$_2$)$_q$— (wherein 1≤n≤10, 1≤p≤10 and 1≤q≤10), —C(CF$_3$)(C$_6$H$_5$)—
—C(=O)NH—, or a combination thereof.

13. The laminated film of claim 9, wherein $E^2$ is a group in which two or more phenylene groups, independently substituted or unsubstituted, are linked with a single bond, —O—, —S—, —(CH$_2$)$_p$—, —(CF$_2$)$_q$— (wherein 1≤p≤10 and 1≤q≤10), or a combination thereof.

14. The laminated film of claim 9, wherein A of Chemical Formula 2 is an unsubstituted phenylene group, an unsubstituted biphenylene group, or a combination thereof, and $E^2$ is a group represented by Chemical Formula 7 or a group represented by Chemical Formula 8:

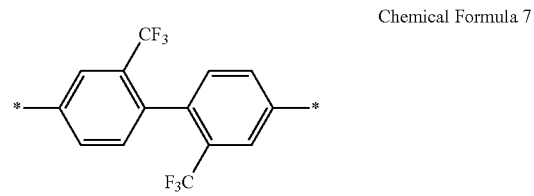

Chemical Formula 7

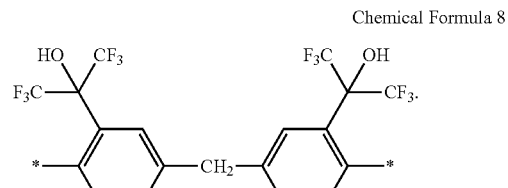

Chemical Formula 8

15. The laminated film of claim 1, wherein the poly (amide-imide) copolymer of the first layer comprises about 30 mol % to about 80 mol % of an amide structural unit based on a total number of moles of structural units in the poly(amide-imide) copolymer.

16. The laminated film of claim 1, wherein the first layer has a thickness of about 10 micrometers to about 300 micrometers, and the second layer has a thickness of about 0.1 micrometers to about 10 micrometers.

17. The laminated film of claim 1, wherein the laminated film has an average transmittance of greater than or equal to 89% in a wavelength range of about 300 nanometers to about 760 nanometers, and a yellow index YI of less than or equal to 2.5.

18. The laminated film of claim 1, wherein the second layer is laminated to the one surface and an opposite surface of the first layer, and
wherein the laminated film further comprises a hard coating layer disposed on the second layer laminated to the one surface of the first layer, and an adhesive layer disposed on the second layer laminated to the opposite surface of the first layer.

19. A composition product for preparing a laminated film, the composition product comprising a first composition for forming the first layer, and a separate second composition for forming the second layer, wherein the first and the second compositions form a first layer and a second layer, respectively, with the second layer laminated on at least one surface of the first layer,
the first composition comprising a poly(amide-imide) copolymer that comprises an imide structural unit represented by Chemical Formula 1, and an amide structural unit represented by Chemical Formula 2, and has a weight average molecular weight of about grams/mole to about 50,000 grams/mole to about 100,000 grams/mole, and
the second composition comprising a polyimide that comprises an imide structural unit represented by Chemical Formula 1, and has a weight average molecular weight is about 10,000 grams/mole to about 45,000 grams/mole, a poly(amide-imide) copolymer that comprises an imide structural unit represented by Chemical Formula 1, and an amide structural unit represented by Chemical Formula 2, wherein a content of the amide structural unit represented by Chemical Formula 2 is less than or equal to about 30 mol % based on the total number of moles of structural units, and has a weight average molecular weight of about 10,000 grams/mole to about grams/mole, or a combination thereof:

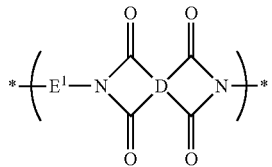

Chemical Formula 1 wherein, in Chemical Formula 1,
D is a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof, the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof, E$^1$ is a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof;

Chemical Formula 2 wherein, in Chemical Formula 2,
A and E$^2$ are each independently a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, and the alicyclic organic group, the aromatic organic group, or the heteroaromatic organic group, is a single ring, a condensed ring in which at least two rings are fused, or at least two rings independently selected from the single ring or the condensed ring, which are linked with each other by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), —C(CF$_3$)(C$_6$H$_5$)—, —C(=O)NH—, or a combination thereof.

20. A laminated film prepared by coextrusion and in-line coating of the first composition and the second composition of the composition product of claim 19.

* * * * *